US012283475B2

(12) United States Patent
Jarrold et al.

(10) Patent No.: US 12,283,475 B2
(45) Date of Patent: Apr. 22, 2025

(54) INSTRUMENT, INCLUDING AN ELECTROSTATIC LINEAR ION TRAP, FOR ANALYZING IONS

(71) Applicant: THE TRUSTEES OF INDIANA UNIVERSITY, Bloomington, IN (US)

(72) Inventors: Martin F. Jarrold, Bloomington, IN (US); Joanna A. Hogan, Hillsboro, OR (US)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 0 days.

(21) Appl. No.: 18/190,168

(22) Filed: Mar. 27, 2023

(65) Prior Publication Data

US 2023/0245879 A1 Aug. 3, 2023

Related U.S. Application Data

(63) Continuation of application No. 17/468,791, filed on Sep. 8, 2021, now Pat. No. 11,646,191, which is a (Continued)

(51) Int. Cl.
*H01J 49/42* (2006.01)
*H01J 49/00* (2006.01)
(Continued)

(52) U.S. Cl.
CPC ...... *H01J 49/4245* (2013.01); *H01J 49/0036* (2013.01); *H01J 49/025* (2013.01); (Continued)

(58) Field of Classification Search
CPC .. H01J 49/4245; H01J 49/0036; H01J 49/025; H01J 49/062; H01J 49/406;
(Continued)

(56) References Cited

U.S. PATENT DOCUMENTS 3,019,168 A 1/1962 Taylor
5,285,063 A 2/1994 Schwartz et al.
(Continued)

FOREIGN PATENT DOCUMENTS

JP 11144675 5/1999
JP 2008186730 A 8/2008
(Continued)

OTHER PUBLICATIONS

PCT International Search Report and Written Opinion completed by the ISA/US on Oct. 11, 2021 and issued in connection with PCT/US2021/034480.
(Continued)

*Primary Examiner* — Kiet T Nguyen
(74) *Attorney, Agent, or Firm* — Barnes & Thornburg LLP

(57) ABSTRACT

An instrument for analyzing ions may include an ion source to generate ions, at least one ion processing instrument to process the generated ions by one or both of filtering the ions according to a molecular characteristic and dissociating the ions, and an electrostatic linear ion trap (ELIT) to receive and trap ions exiting the at least one ion processing instrument. The ELIT has first and second ion mirrors separated by a charge detection cylinder, and is configured such that trapped ions oscillate back and forth through the charge detection cylinder between the first and second ion mirrors with a duty cycle, corresponding to a ratio of time spent by the trapped ions traversing the charge detection cylinder and total time spent by the trapped ions traversing a combination of the first and second ion mirrors and the charge detection cylinder during one complete oscillation cycle, of approximately 50%.

20 Claims, 6 Drawing Sheets

Related U.S. Application Data continuation of application No. 16/960,170, filed as application No. PCT/US2019/013251 on Jan. 11, 2019, now Pat. No. 11,232,941.

(60) Provisional application No. 62/680,343, filed on Jun. 4, 2018, provisional application No. 62/616,860, filed on Jan. 12, 2018.

(51) Int. Cl.
*H01J 49/02* (2006.01)
*H01J 49/06* (2006.01)
*H01J 49/40* (2006.01)
*H01J 49/48* (2006.01)

(52) U.S. Cl.
CPC .......... *H01J 49/062* (2013.01); *H01J 49/406* (2013.01); *H01J 49/4235* (2013.01); *H01J 49/4265* (2013.01); *H01J 49/48* (2013.01)

(58) Field of Classification Search
CPC .... H01J 49/4235; H01J 49/4265; H01J 49/48; H01J 49/027
USPC .......................................................... 250/282
See application file for complete search history.

(56) References Cited

U.S. PATENT DOCUMENTS 5,478,745 A 12/1995 Samulski
5,572,025 A 11/1996 Cotter
5,770,857 A 6/1998 Fuerstenau et al.
5,863,541 A 1/1999 Samulski et al.
5,869,248 A 2/1999 Yuan et al.
5,877,022 A 3/1999 Stinchcomb et al.
5,880,466 A 3/1999 Benner
5,882,652 A 3/1999 Valdes et al.
5,886,346 A 3/1999 Makarov
5,905,040 A 5/1999 Mazzara et al.
5,916,563 A 6/1999 Young et al.
5,965,358 A 10/1999 Carrion et al.
6,013,487 A 1/2000 Mitchell
6,083,702 A 7/2000 Mitchell et al.
6,156,303 A 12/2000 Russell et al.
6,183,950 B1 2/2001 Madonna
6,583,408 B2 6/2003 Smith et al.
6,744,042 B2 6/2004 Zajfman et al.
6,753,523 B1 6/2004 Whitehouse
6,888,130 B1 5/2005 Gonin
7,314,912 B1 1/2008 Hallek et al.
7,829,842 B2 11/2010 Makarov
8,294,085 B2 10/2012 Ding
8,395,112 B1 3/2013 Bier
8,409,870 B2 4/2013 Van Wuijckhuijse
8,766,170 B2 7/2014 Guna et al.
8,866,074 B2 10/2014 Okumura
8,963,075 B2 2/2015 Chen et al.
9,095,793 B2 8/2015 Flagan
10,056,244 B1 8/2018 Quarmby et al.
10,088,451 B2 10/2018 Giles et al.
11,257,665 B2 2/2022 Jarrold et al.
2002/0185606 A1 12/2002 Smith et al.
2003/0155502 A1 8/2003 Grosshans et al.
2004/0169137 A1 9/2004 Westphall et al.
2005/0236375 A1 10/2005 Gefter et al.
2007/0102634 A1 5/2007 Frey et al.
2007/0254352 A1 11/2007 Schaffer et al.
2009/0020694 A1 1/2009 Florey
2009/0078866 A1 3/2009 Li et al.
2009/0108194 A1 4/2009 Page et al.
2009/0189069 A1 7/2009 Chen
2009/0294641 A1 12/2009 Konicek et al.
2009/0294655 A1 12/2009 Ding et al.
2010/0084549 A1 4/2010 Ermakov et al.
2010/0084552 A1 4/2010 Kawana
2010/0090102 A1 4/2010 Rather et al.
2010/0227310 A1 9/2010 Manalis et al.
2010/0234837 A1 9/2010 Alfano
2010/0314538 A1 12/2010 Makarov et al.
2010/0320377 A1 12/2010 Cotter
2011/0095175 A1 4/2011 Bateman
2011/0240845 A1 10/2011 Ding
2012/0112056 A1 5/2012 Brucker et al.
2012/0282641 A1 11/2012 Reilly et al.
2013/0068942 A1 3/2013 Verenchikov
2013/0124099 A1 5/2013 Ecker et al.
2013/0175440 A1 7/2013 Perelman et al.
2013/0200261 A1 8/2013 Mizutani et al.
2013/0234017 A1 9/2013 Kaltashov et al.
2013/0327934 A1 12/2013 Makarov et al.
2014/0197333 A1 7/2014 Jolliffe et al.
2014/0299766 A1 10/2014 Anderson et al.
2014/0346344 A1 11/2014 Chen
2015/0008316 A1 1/2015 Guna
2015/0021472 A1 1/2015 Makarov
2015/0325425 A1 11/2015 Makarov
2015/0331000 A1 11/2015 Collier et al.
2016/0005580 A1 1/2016 Grinfeld
2016/0035556 A1 2/2016 Berkout et al.
2016/0181084 A1 6/2016 Smith
2016/0336165 A1 11/2016 Guna
2017/0040152 A1 2/2017 Makarov
2017/0307565 A1 10/2017 Clemmer et al.
2017/0372883 A1 12/2017 Verenchikov
2018/0247805 A1 8/2018 Continetti et al.
2019/0088459 A1 3/2019 Takahashi
2019/0236142 A1 8/2019 Balakrishnan
2020/0003739 A1 1/2020 Yamamoto et al.
2020/0243317 A1 7/2020 Lopez-Hilfiker et al.
2020/0357626 A1 11/2020 Jarrold et al.
2021/0202225 A1* 7/2021 Jarrold .................. H01J 49/025
2021/0210332 A1* 7/2021 Jarrold .................. H01J 49/027
2021/0210335 A1* 7/2021 Jarrold ................ H01J 49/0031
2021/0217606 A1 7/2021 Jarrold et al.

FOREIGN PATENT DOCUMENTS

JP 2011-507194 A 3/2011
JP 2011523172 A 8/2011
JP 2014501429 A 1/2014
JP 2014-122908 A 9/2014
JP 2014165053 A 9/2014
JP 2016522401 A 7/2016
JP 2019-056598 A 4/2019
WO 1998011244 A1 3/1998
WO 1999061601 A1 12/1999
WO 2000028004 A1 5/2000
WO 2000028061 A1 5/2000
WO 2001092551 A2 5/2001
WO 2003042704 A1 5/2003
WO 2006130474 A2 12/2006
WO 2010135830 A1 12/2010
WO 2012080352 A1 6/2012
WO 2012083031 A1 6/2012
WO 2012145037 A1 10/2012
WO 2016073850 A1 5/2016
WO 2017162779 A1 9/2017
WO 2017190031 A1 11/2017
WO 2018109895 A1 6/2018
WO 2019118242 A1 6/2019
WO 2019140233 A1 7/2019
WO 2019162687 A1 8/2019
WO 2019/236142 A1 12/2019
WO 2019231854 A1 12/2019
WO 2020/117292 A1 6/2020
WO 2020/219527 A1 10/2020
WO 2021/158676 A1 8/2021

OTHER PUBLICATIONS

Paul et al., Das elektrische massenfilter als massenspektromeler und isotopenlrenner. Z. Phys. 152, 143-182 (1958).

(56) References Cited

OTHER PUBLICATIONS

Paul, et al., Das elektrische massenfiller, Z. Phys. 140, 262-273 (1955).
Pierson, Elizabeth E., et al., Charge Detection Mass Spectrometry for Single Ions with an Uncertainty in the Charge Measurement of 0.65 e; Elizabeth E_ Pierson et al.; Journal American Society for Mass Spectrometry, vol. 26, pp. 1213-1220 (2015).
Pierson, Elizabeth E., et al. "Charge Detection Mass Spectrometry Identifies Preferred Non-icosahedral Polymorphs in the Self-Assembly of Woodchuck Hepatitis Virus Capsids", Jour. of Molecular Biology, vol. 428, Issue 2, pp. 292-300. Jan. 29, 2016.
Pierson, Elizabeth E., et al., "Detection of 1-15 Late Intermediates in Virus Capsid Assembly by Charge Detection Mass Spectrometry", Journal of the American Chemical Society, vol. 136, No. 9, Feb. 19, 2014, 3536-3541.
Pierson, Elizabeth, "Charge Detection Mass Spectrometry: Instrumentation & Applications to Viruses", Proquest Dissertations and Theses; Thesis (Ph.D.) vol. 76-09(E), Section: B. 168, May 2015.
Puttaraju, M., et al. "Spliceosome-mediated RNA trans-splicing as a tool for gene therapy", Nature Biotechnology, vol. 17, pp. 246-252 (Mar. 1999).
Richards et al., A new operating mode for the quadrupole mass filler. Int. J. Mass Spectrom. Ion Phys. 12, 317-339 1973).
Richards et al., Waveform parameter tolerances for the quadrupole mass filler with rectangular excitation. Int. J. Mass Spectrom. Ion Phys_ 15, 417-428 (1974).
Schlunegger et al., Frequency scan for the analysis of high mass ions generated by matrix-assisted laser esorption/ionization in a Paul trap_ Rapid Commun. Mass Spectrom. 13, 1792-1796 (1999).
Shade, Rosemary, et al. "Nucleotide Sequence and Genome Organization of Human Parvovirus B19 Isolated from the Serum of a Child during plastic Crisis", Journal of Virology, vol. 58, No. 3, pp. 921-936 (Jun. 1986).
Sharp, Phillip A., et al. "RNA Interference", American Association for the Advancement of Science; Science, New Series, vol. 287, No. 5462, pp. 2431-2433 (Mar. 31, 2000).
Shi, Z., et al. "Insertional Mutagenesis at Positions 520 and 584 of Adena-Associated Virus Type 2 (MV2) Capsid Gene and Generation of MV2 Vectors with Eliminated Heparin-Binding Ability and Introduced Novel Tropism", Human Gene Therapy, vol. 17, pp. 353-361 (Mar. 2006).
Shinholt, Deven L., et al., "A Frequency and Amplitude Scanned Quadrupole Mass Filter for the Analysis of High m/z Ions", Review of Scientific Instruments 85, 113109 (2014) (accepted Oct. 17, 2014; published online Nov. 21, 2014).
Snijder, J., et al., "Defining the Stoichiometry and Cargo Load of Viral and Bacterial Nanoparticles by Orbitrap Mass Spectrometry", J. Am. Chem. Soc. 2014, 136, 7295-7299.
Sobott et al., A tandem mass spectrometer for improved transmission and analysis of large macromolecular Assemblies. Anal. Chem. 74, 1402-1407 (2002).
Sonalikar, Hrishikesh S., et al. "Numerical analysis of segmented-electrode Orbitraps", International Journal of Mass Spectrometry, Elsevier Science Publishers, Amsterdam, NL, vol. 395, Dec. 17, 2015 (Dec. 17, 2015), p. 36-48.
Srivastava, Arun, et al., "Nucleotide Sequence and Organization of the Adena-Associated Virus 2 Genome", Journal of Virology, vol. 45, No. 2, pp. 555-564 (Feb. 1983).
Syed, et al., Quadrupole mass filler: Design and performance for operation in stability zone 3. J. Am. Soc. Mass Spectrom. 24, 1493-1500 (2013).
Todd, Aaron R., et al. "Implementation of a Charge-Sensitive Amplifier without a Feedback Resistor for Charge Detection Mass Spectrometry Reduces Noise and Enables Detection of Individual Ions Carrying a Single Charge", J. Am. Soc. Mass Spectrom. 2020, 31, 146-154.
Tsao, Jun, et al., "The Three-Dimensional Structure of Canine Parvovirus and Its Functional Implications", American Association for the Advancement of Science, Science, New Series, vol. 251, No. 5000, pp. 1456-1464 (Mar. 22, (1991).
Walters, Robert W., "Structure of Adeno-Associated Virus Serotype 5", Journal of Virology, vol. 78, No. 7, pp. B361-3371 (Apr. 2004).
Wang, Lei, et al., "Expanding the Genetic Code", Annual Review of Biophysics and Biomolecular Structure, vol. 35, pp. 25-249 (2006).
Weiss, Victor U., et al., "Analysis of a Common Cold Virus and Its Subviral Particles by Gas-Phase Electrophoretic Mobility Molecular Analysis and Native Mass Spectrometry", Anal Chem. 2015.
Winger, Brian E., et al., "Observation and Implications of High Mass-to-Charge Ratio lons from Electrospray Ionization Mass Spectrometry," 1993 American Society for Mass Spectrometry 4, 536-545.
Wright, J. Fraser, "Product-Related Impurities in Clinical-Grade Recombinant AAV Vectors: Characterization and Risk Assessment", Biomedicines 2014, 2, 80-97.
Xiao, Weidong, et al., "Gene Therapy Vectors Based on Adena-Associated Virus Type 1", Journal of Virology, vol. 73, No. 5, pp. 3994-4003 (May 1999).
Xie, Qing, et al., "Canine Parvovirus Capsid Structure, Analyzed at 2.9 A Resolution", Journal of Molecular Biology, vol. 64, pp. 497-520 (1996).
Xie, Qing, et al., "The atomic structure of adeno-associated virus (MV-2), a vector for human gene therapy", PNAS, vol. 99, No. 16, pp. 10405-10410 (Aug. 6, 2002).
Xiong, et al., The development of charge detection-quadrupole ion trap mass spectrometry driven by rectangular and riangularwaves, Analyst 137, 1199-1204 (2012).
Uetrecht et al., "Stability and Shape of Hepatitis B Virus Capsids In Vacuo", Angew. Chem. Int. Ed. 2008, 47, 6247-6251.
Uetrecht et al., "High-resolution mass spectrometry of viral assemblies: Molecular composition and stability of dimorphic hepatitis B virus capsids", PNAS 2008, vol. 105, 9216-9920.
Yang, et al., Development of a palm portable mass spectrometer. J. Amer. Soc. Mass Spec. 19, 1442-1448 (2008).
Yost, et al., Selected ion fragmentation with a tandem quadrupole mass spectrometer. J. Am. Chem. Soc. 100, 274-2275 (1978).
Bioconjugate Techniques; Hermanson;Academic Press, 1st Edition (1996), (book reference, chapter guide attached; book/specific chapter(s) to be made available upon request).
European Office Action dated Sep. 2, 2021 for application 19 707 901.5—5 pages.
European Office Action dated Sep. 9, 2022 for application 19 702 771.7—5 pages.
European Office Action dated Sep. 9, 2022 for application 19 702 775.8—5 pages.
European Office Action dated Nov. 23, 2022 for application 19 702 773.3—5 pages.
Examination report No. 1 issued Oct. 21, 2022 in Australian Application No. 2019281255—4 pages.
PCT International Search Report and Written Opinion completed by the ISA/US on Aug. 26, 2022 issued in connection with PCT/US2022/073503.
Japanese Office Action dispatched Jan. 6, 2023 for application 2020-568366—9 pages.
Japanese Office Action dispatched Jan. 18, 2023 for application 2020-568469—16 pages.
Japanese Office Action dispatched Jan. 18, 2023 for application 2020-568379—11 pages.
Japanese Office Action dispatched Jan. 24, 2023 for application 2021-527871—4 pages.
Japanese Office Action dispatched Jan. 31, 2023 for application 2020-568364—9 pages.
Japanese Office Action dispatched Feb. 17, 2023 for application 2020-568389—11 pages.
European Office Action issued Mar. 3, 2023 for application 19732193.8—14 pages.
Office Action and Search Report for CN patent application No. 201980051696.1, dated Sep. 25, 2023. (translation appended).
PCT International Search Report and Written Opinion completed by the ISA/US on Jan. 12, 2016 and issued in connection with PCT/US2015/059463.
PCT International Search Report and Written Opinion completed by the ISA/US on Jun. 19, 2017 and issued in connection with PCT/US2017/030163.

(56) References Cited

OTHER PUBLICATIONS

PCT International Search Report and Written Opinion completed by the ISA/EP on Feb. 14, 2019 and issued in connection with PCT/US2018/051944.
PCT International Search Report and Written Opinion completed by the ISA/EP on Apr. 18, 2019 and issued in connection with PCT/US2019/013251.
PCT International Search Report and Written Opinion completed by the ISA/EP on Apr. 16, 2019 and issued in connection with PCT/US2019/013274.
PCT International Search Report and Written Opinion completed by the ISA/EP on Mar. 27, 2019 and issued in connection with PCT/US2019/013277.
PCT International Search Report and Written Opinion completed by the ISA/EP on Jul. 24, 2019 and issued in connection with PCT/US2019/013278.
PCT International Search Report and Written Opinion completed by the ISA/EP on Sep. 9, 2019 and issued in connection with PCT/US2019/013279.
PCT International Search Report and Written Opinion completed by the ISA/EP on Mar. 28, 2019 and issued in connection with PCT/US2019/013280.
PCT International Search Report and Written Opinion completed by the ISA/EP on Aug. 27, 2019 and issued in connection with PCT/US2019/013281.
PCT International Search Report and Written Opinion completed by the ISA/EP on Mar. 27, 2019 and issued in connection with PCT/US2019/013283.
PCT International Search Report and Written Opinion completed by the ISA/EP on Mar. 29, 2019 and issued in connection with PCT/US2019/013284.
PCT International Search Report and Written Opinion completed by the ISA/EP on Jul. 26, 2019 and issued in connection with PCT/US2019/013285.
PCT International Search Report and Written Opinion completed by the ISA/EP on Sep. 9, 2019 and issued in connection with PCT/US2019/035379.
PCT International Search Report and Written Opinion completed by the ISA/EP on Aug. 27, 2019 and issued in connection with PCT/US2019/035381.
PCT International Search Report and Written Opinion completed by the ISA/US on Jan. 24, 2021 and issued in connection with PCT/US2020/054975.
PCT International Search Report and Written Opinion completed by the ISA/EP on Mar. 8, 2021 and issued in connection with PCT/US2020/065300.
PCT International Search Report and Written Opinion completed by the ISA/EP on Jul. 14, 2020 and issued in connection with PCT/US2020/029287.
PCT International Search Report and Written Opinion completed by the ISA/US on Nov. 23, 2020 and issued in connection with PCT/US2020/052009.
PCT International Search Report and Written Opinion completed by the ISA/EP on Mar. 8, 2021 and issued in connection with PCT/US2020/065301.
PCT International Search Report and Written Opinion completed by the ISA/US on Mar. 18, 2021 and issued in connection with PCT/US2021/016325.
PCT International Search Report and Written Opinion completed by the ISA/US on Apr. 5, 2021 and issued in connection with PCT/US2021/016435.
Supplemental European Search Report for European Patent Application No. 17790559.3 dated Nov. 12, 2019 (11 pages).
Anthony, Staci N. "MS /MS instrumentation for megadalton-sized ions", 2016, XP055619426, ISBN: 978-1-369-02558-3 Retrieved from the Internet: URL:https://search.proquest.com/docview/1830450391?accountid=29404.
Anthony, et al., A simple electrospray interface based on a DC ion carpet, Int. J. Mass Spectrom. 371, 1-7 (2014).
Bantel-Schaal, U., et al., "Human Adena-Associated Virus Type 5 Is Only Distantly Related to Other Known Primate Helper-Dependent Parvoviruses", Journal of Virology, vol. 73, pp. 939-947 (Feb. 1999).
Beuhler, et al., Threshold studies of secondary electron emission induced by macro ion impact on solid surfaces. Nucl. Instrum. Methods. 170, 309-315 (1980).
Beuhler, et al., A study of the formation of high molecular weight water cluster ions (m/e < 59000) in expansion of onized gas mixtures, J. Chem. Phys. 77, 2549-2557 (1982).
Botamanenko, Daniel, et al., "Ion-Ion Interactions in Charge Detection Mass Spectrometry", J Am Soc Mass Spectrom. Dec. 2019 ; 30(12): 2741-2749. doi: 10.1007/s13361-019-02343-y.
Brancia, et al., Digital asymmetric waveform isolation (DAWI) in a digital linear ion trap. J_ Am. Soc_ Mass Spectrom. 1. 1530-1533 (2010).
Brown, C., et al. "Chimeric Parvovirus B19 Capsids for the Presentation of Foreign Epitope",; Virology 198, pp. 477-488 (1994).
Brown, Brooke Ann, et al., "Charge Detection Mass Spectrometry Measurements of Exosomes and other Extracellular Particles Enriched from Bovine Milk" Anal. Chem., Just Accepted Manuscript • DOI: 10.1021/acs.analchem.9b05173 • Publication Date (Web): Jan. 28, 2020 Downloaded from pubs.acs.org on Jan. 30, 2020.
Burnham, et al. "Analytical Ultracentrifugation as an Approach to Characterize Recombinant Adena-Associated Viral Vectors", Human Gene Therapy Methods, vol. 26, No. 6; pp. 228-242, Oct. 15, 2015.
Chao, Hengiun, et al. "Several Log Increase in Therapeutic Transgene Delivery by Distinct Adena-Associated Viral Serotype Vectors" Molecular Therapy vol. 2, No. 6, pp. 619-623 (Dec. 2000).
European Office Action dated Jun. 26, 2024 and issued in connection with EP Patent Appln. No. 19707901.5, 8 pages.
Non-Final Office Action, mailed Sep. 29, 2024 and issued in connection with U.S. Appl. No. 17/781,483, 84 pages.
Extended EP Search Report completed Aug. 29, 2024 and issued in connection with EP Appln. No. 24174366., 12 pages.
English translation of an Office Action for Japanese Patent Appln. No. 2022-547047, dated Aug. 1, 2024.
Chiorini, John A., et al. "Cloning of Adeno-Associated Virus Type 4 (MV4) and Generation of Recombinant MV4 Particles", Journal of Virology, vol. 71, pp. 6823-6833 (Sep. 1997).
Chiorini, John A., "Cloning and Characterization of Adeno-Associated Virus Type 5", Journal of Virology, vol. 73, DP-1309-1319 (Feb. 1999).
Chernushevich, et al., Collisional cooling of large ions in electrospray mass spectrometry. Anal. Chem 76. H54-1760 (2004).
Cleves, Ann E., "Protein transport: The nonclassical ins and outs", Current Biology, vol. 7, No. 5, pp. 318-320 (1997).
Contino, Nathan Colby, "Ion trap charge detection mass spectrometry: Lowering limits of detection and improving signal to noise", ISBN: 9781303535048, Jul. 30, 2013 (Jul. 30, 2013).
Ding, et al., A simulation study of the digital ion trap mass spectrometer. Int. J. Mass Spectrom. 221, 117-138 (2002).
Ding, et al., A digital ion trap mass spectrometer coupled with atmospheric pressure ion sources. J_ Mass Spectrom. 69, 471-484 (2004).
Douglas J_ Linear quadrupoles in mass spectrometry. Mass Spectrom. Rev. 28, 937-960 (2009).
Doussineau, Tristan, et al. "Infrared multiphoton dissociation tandem charge detection-mass spectrometry of single megadalton electrosprayed ions", Review of Scientific Instruments, AIP, Melville, NY, US, vol. 82, No. 8, Aug. 1, 2011, pp. 84104-84104.
Draper, Benjamin E., et al. "The FUNPET—a New Hybrid Ion Funnel-Ion Carpet Atmospheric Pressure Interface for the Simultaneous Transmission of a Broad Mass Range", Journal of the American Society for Mass Spectrometry, Elsevier Science Inc, US, vol. 29, No. 11, Aug. 15, 2018, pp. 2160-2172.
Draper, Benjamin E., et al., "Real-Time Analysis and Signal Optimization for Charge Detection Mass Spectrometry", J. Am. Soc. Mass Spectrom. (2019) 30:898Y904.
El-Baba, Tarick J. et al., "Melting proteins confined in nanodroplets with 10.6 [mu]m light provides clues about early steps of denaturation", Chemical Communications, vol. 54, No. 26, Mar. 8, 2018 (Mar. 8, 2018), p. 3270-3273.

(56) References Cited

OTHER PUBLICATIONS

Elliott, Andrew G., et al. "Simultaneous Measurements of Mass and Collisional Cross-Section of Single Ions with charge Detection Mass Spectrometry", Analytical Chemistry, vol. 89, No. 14, Jun. 16, 2017, pp. 7701-7708.
Elliott, Andrew G., et al. "Single Particle Analyzer of Mass: A Charge Detection Mass Spectrometer with a Multi-Detector Electrostatic Ion Trap", International Journal of Mass Spectrometry, Elsevier Science Publishers, Amsterdam, NL, vol. 414, Jan. 15, 2017, pp. 45-55.
Elliott, Andrew G., et al. "Effects of Individual Ion Energies on Charge Measurements in Fourier Transform Charge Detection Mass Spectrometry (FT-CDMS)", Journal of the American Society for Mass Spectrometry., Nov. 14, 2018 (Nov. 14, 2018).
Fernandez-Maestre et al. "Ammonia as a Modifier in Ion Mobility Spectrometry: Effects on Ion Mobilities and Potential as a Separation Tool", J. Chil. Chem. Soc. 2014. 59, No. 1, especially: abstract; p. 2398, col. 1, para 1; p. 2398, col. 1, para 2; p. 2398, col. 2, para 2; p. 2399, Figure 1; p. 2402, col. 1, para 1; p. 2402, col. 2, para 1; Figure 6a. Figure 6b.
Fuerstenau, et al., "Mass Spectrometry of an Intact Virus", Agnew. Chem. 2001, 559-562.
Gao, Guangping, et al. "Clades of Adeno-Associated Viruses Are Widely Disseminated in Human Tissues", vol. 78, pp. 6381-6388 (Jun. 2004).
Gao, Guangping, et al. "Novel Adeno-Associated Viruses from Rhesus Monkeys as Vectors for Human Gene Therap",.; National Academy of Sciences, vol. 99, No. 18, pp. 11854-11859 (Sep. 3, 2002).
Gorman, Linda, et al. "Stable Alteration of Pre-mRNA Splicing Patterns by Modified U7 Small Nuclear RNAs", National Academy of Sciences, vol. 95, No. 9, pp. 4929-4934 (Apr. 28, 1998).
Grifman, M., et al. "Incorporation of Tumor-Targeting Peptides into Recombinant Adeno-associated Virus Capsids", Molecular Therapy, vol. 3, No. 6, pp. 964-975 (Jun. 2001).
Grinfeld, Dmitry, et al. "Space-Charge Effects in An Electrostatic Multireflection Ion Trap", European Journal of Mass Spectrometry, vol. 20, No. 2, Apr. 1, 2014 (Apr. 1, 2014), p. 131-142.
Hauck, B., et al. "Characterization of Tissue Tropism Determinants of Adeno-Associated Virus Type 1", Journal of Virology, vol. 77, No. 4, pp. 2768-2774 (Feb. 2003).
Heller, Manfred, et al. "Mass spectrometry-based analytical tools for the molecular protein characterization of human plasma lipoproteins", Proteomics, vol. 5, No. 19, Jul. 1 (205-97-91) , pp. 2619-2639. (2005).
Hogan, Joanna, et al. "Optimized Electrostatic Linear Ion Trap for Charge Detection Mass Spectrometry", Jul. 9, 2018 (Jul. 9, 2018), vol. 29, No. 10, p. 2086-2095.
Hutchins, Patrick M., et al. "Quantification of HDL Particle Concentration by Calibrated Ion Mobility Analysis", Clinical Chemistry 60:11, 1393-1401, 2014.
Kafle et al. "Understanding gas phase modifier interactions in rapid analysis by Differential Mobility-Tandem Mass Spectrometry", J Am Soc Mass Spectrom. 2014. 25(7): pp. 1098-1113, especially: p. 7, para 2; p. 10, para 5; p. 11, para 1.
Keifer, David Z., "Single-Molecule Mass Spectrometry", Mass Spectrometry Reviews, vol. 36 pp. 715-733 (2017).
Keifer, David Z., et al. "Charge detection mass spectrometry: weighing heavier things" The Analyst, vol. 142, No. 10, Jan. 1, 2017, pp. 1654-1671.
Keifer, David Z., et al. "Charge Detection Mass Spectrometry with Almost Perfect Charge Accuracy", Analytical Chemistry, vol. 87, No. 20, Oct. 20, 2015, pp. 10330-10337.
Keifer, David et al., "Charge Detection Mass Spectrometry of Bacteriophage P22 Procapsid Distributions Above 20MDa", Rapid Communications in Mass Spectrometry, vol. 28, No. 5, Mar. 15, 2014.
Kelly, Ryan T., et al. "The ion funnel: Theory, implementations, and applications", Mass Spectrometry Reviews., vol. 29, Apr. 23, 2009, pp. 294-312.
Kim et al., A multicapillary inlet jet disruption electrodynamic ion funnel interface for improved sensitivity using atmospheric pressure ion sources. Anal. Chem. 73, 4162-4170 (2001).
Kiss et al. "Size, weight and position: ion mobility spectrometry and imaging MS combined", Anal Bioanal Chem. 2011. 399: pp. 2623-2634, especially: p. 2626, col. 1, para 1.
Koizumi et al., A novel phase-coherent programmable clock for high-precision arbitrary waveform generation applied o digital ion trap mass spectrometry_ Int. J_ Mass Spectrom_ 292, 23-31 (2010).
Konenkov et al., Matrix methods for the calculation of stability diagrams in quadrupole mass spectrometry. J. Amer. Soc. Mass Spec. 13, 597-613 (2002).
Kosaka, Nobuyoshi, et al., "Versatile roles of extracellular vesicles in cancer," J Clin Invest. 2016; 126(4):1163-1172. https://doi.org/10.1172/JCI81130.
Kukreja, Alexander A., et al. "Structurally Similar Woodchuck and Human Hepadnavirus Core Proteins Having Distinctly Different Temperature Dependencies of Assembly" Journal of Virology, vol. 68, No. 24, 14105-14115, Sep. 24, 2014.
Landais et al., Varying the radio frequency: A new scanning mode for quadrupole analyzers. Rapid Commun. Mass Spectrom. 12, 302-306 (1998).
Makarov, Alexander, "Electrostatic Axially Harmonic Orbital Trapping: A High-Performance Technique of Mass Analysis", Analytical Chemistry, vol. 72, No. 6, Mar. 1, 2000 (Mar. 1, 2000), p. 1156-1162.
Marmet et al., A frequency-swept quadrupole mass filler. Int. J_ Mass Spectrom. Ion Proc. 42, 3-10 (1982).
Martin, Stability of doubly charged alkali halide clusters. J_ Chem. Phys. 76, 5467-5469 (1982).
Miyamura, K., et al. "Parvovirus Particles as Platforms for Protein Presentation", National Academy of Sciences, vol. 1,No. 18,pp. 8507-8511 (Aug. 30, 1994).
Mori, Seiichiro, Mori, et al. "Two novel adeno-associated viruses from cynomolgus monkey: pseudotyping characterization of capsid protein", Virology 330, pp. 375-383 (2004).
Muramatsu, S., et al. "Nucleotide Sequencing and Generation of an Infectious Clone of Adeno-Associated Virus 3", Virology vol. 221; Article No. 0367; pp. 208-217 (1996).
Muzyczka, N., "Use of Adeno-Associated Virus as a General Transduction Vector for Mammalian Cells", Current Topics n Microbiology and Immunology, vol. 158, pp. 97-129 (1992)_.
Nie et al., Frequency scan of a quadrupole mass analyzer in the third stability region for protein analysis. J. Chin. Chem_ Soc., 53, 47-52 (2006).
Padron, Eric, et al. "Structure of Adeno-Associated Virus Type 4", Journal of Virology, vol. 79, No. 8, pp. 5047-5058 Apr. 2005).
English translation of an Office Action for Japanese Patent Appln. No. 2022-537367, dated Oct. 8, 2024, 6 pages.
English translation of an Office Action for Japanese Patent Appln. No. 2022-537360, dated Oct. 8, 2024, 3 pages.
European Office Action dated Dec. 9, 2024 and issued in connection with EP Appln. No. 20839501.2, 5 pages.
European Office Action dated Dec. 9, 2024 and issued in connection with EP Appln. No. 20839500.4, 5 pages.
Japanese Office Action (including English translation) issued in App. No. JP2022537360, dated Oct. 8, 2024, 6 pages.
Japanese Office Action (including English translation) issued in App. No. JP2022537367, dated Oct. 8, 2024, 11 pages.
Japanese Office Action (including English translation) issued in App. No. JP2022518995, dated Dec. 3, 2024, 6 pages.
Chinese Office Action (including English translation) issued in App. No. CN202080096842.5, dated Dec. 12, 2024, 19 pages.

* cited by examiner

INSTRUMENT, INCLUDING AN ELECTROSTATIC LINEAR ION TRAP, FOR ANALYZING IONS

CROSS-REFERENCE TO RELATED APPLICATIONS

This application is a continuation of U.S. patent application Ser. No. 17/468,791, filed Sep. 8, 2021, which is a continuation of U.S. patent application Ser. No. 16/960,170, filed Jul. 6, 2020 and now U.S. Pat. No. 11,232,941, which is a U.S. national stage entry of PCT Application No. PCT/US2019/013251, filed Jan. 11, 2019, which claims the benefit of and priority to U.S. Provisional Patent Application Ser. No. 62/616,860, filed Jan. 12, 2018 and to U.S. Provisional Patent Application Ser. No. 62/680,343, filed Jun. 4, 2018, the disclosures of which are incorporated herein by reference in their entireties.

GOVERNMENT RIGHTS

This invention was made with government support under CHE1531823 and 0832651 awarded by the National Science Foundation. The United States Government has certain rights in the invention.

FIELD OF THE DISCLOSURE

The present disclosure relates generally to charge detection mass spectrometry instruments, and more specifically to performing mass and charge measurements with such instruments.

BACKGROUND

Mass Spectrometry provides for the identification of chemical components of a substance by separating gaseous ions of the substance according to ion mass and charge. Various instruments and techniques have been developed for determining the masses of such separated ions, and one such technique is known as charge detection mass spectrometry (CDMS). In CDMS, ion mass is determined as a function of measured ion mass-to-charge ratio, typically referred to as "m/z," and measured ion charge.

High levels of uncertainty in m/z and charge measurements with early CDMS detectors has led to the development of an electrostatic linear ion trap (ELIT) detector in which ions are made to oscillate back and forth through a charge detection cylinder. Multiple passes of ions through such a charge detection cylinder provides for multiple measurements for each ion, and it has been shown that the uncertainty in charge measurements decreases with $n^{1/2}$, where n is the number of measurements. However, in the continued quest for greater measurement resolution, the ELIT remains limited by uncertainties in both m/z measurements and charge measurements. Accordingly, it is desirable to seek improvements in ELIT design and/or operation which further reduce measurement uncertainties for either or both of ion charge and mass-to-charge ratio (m/z).

SUMMARY

The present disclosure may comprise one or more of the features recited in the attached claims, and/or one or more of the following features and combinations thereof. In one aspect, an instrument for analyzing ions may comprise an ion source configured to generate ions from a sample, at least one ion processing instrument configured to receive the generated ions from the ion source and to process the generated ions by one or a combination of filtering the ions according to a molecular characteristic and dissociating the ions, an electrostatic linear ion trap (ELIT) positioned to receive ions exiting the at least one ion processing instrument and configured to trap at least one of the received ions therein, the ELIT including first and second ion mirrors and a charge detection cylinder positioned between the first and second ion mirrors, and at least one voltage source coupled to the first and second ion mirrors, the at least one voltage source configured to establish electric fields in each of the first and second ion mirrors configured to reflect the trapped at least one ion entering a respective one of the first and second ion mirrors from the charge detection cylinder back through the charge detection cylinder and toward the other of the first and ion mirrors such the trapped at least one ion oscillates back and forth through the charge detection cylinder between the first and second ion mirrors with a duty cycle, corresponding to a ratio of time spent by the trapped at least one ion traversing the charge detection cylinder and total time spent by the trapped at least one ion traversing a combination of the first and second ion mirrors and the charge detection cylinder during one complete oscillation cycle, of approximately 50%.

In another aspect, an instrument for analyzing ions may comprise an ion source configured to generate ions from a sample, at least one ion processing instrument configured to receive the generated ions from the ion source and to process the generated ions by one or a combination of filtering the ions according to a molecular characteristic and dissociating the ions, an electrostatic linear ion trap (ELIT) positioned to receive ions exiting the at least one ion processing instrument and configured to trap at least one of the received ions therein, the ELIT including first and second ion mirrors and a charge detection cylinder positioned between the first and second ion mirrors, and at least one voltage source coupled to the first and second ion mirrors, the at least one voltage source configured to establish electric fields in each of the first and second ion mirrors configured to reflect the trapped at least one ion entering a respective one of the first and second ion mirrors from the charge detection cylinder back through the charge detection cylinder and into the other of the first and second ion mirrors such the trapped at least one ion oscillates back and forth between the first and second ion mirrors each time passing through the charge detection cylinder, wherein time spent by the trapped at least one ion passing through the charge detection cylinder is approximately equal to a sum of time spent by the trapped at least one ion travelling from a stopped position within one of the first and second ion mirrors into a respective end of the charge detection cylinder and time spent by the trapped at least one ion traveling from an opposite respective end of the charge detection cylinder to a stopped position within the other of the first and second ion mirrors.

In a further aspect, a method for analyzing ions may comprise generating ions from a sample, processing the generated ions by one of filtering the ions according to a molecular characteristic and dissociating the ions to produce first processed ions, processing the first processed ions by the other of filtering the ions according to the molecular characteristic and dissociating the ions to produce second processed ions, and analyzing the second processed ions with an electrostatic linear ion trap, having first and second ion mirrors and a charge detection cylinder positioned between the first and second ion mirrors, by (i) establishing a first electric field in the first ion mirror, the first electric field configured to stop in the first ion mirror at least one of the second processed ions exiting a first end of the charge detection cylinder, proximate to the first ion mirror, and traveling into the first ion mirror, and to accelerate the stopped at least one of the second processed ions in the first ion mirror back into the first end of the charge detection cylinder, and (ii) establishing a second electric field in the second ion mirror, the second electric field configured to stop in the second ion mirror the at least one of the second processed ions exiting a second end of the charge detection cylinder, proximate to the second ion mirror, and traveling into the second ion mirror, and to accelerate the stopped at least one of the second processed ions in the second ion mirror back into the second end of the charge detection cylinder, such that the at least one of the second processed ions oscillates back and forth between the first and second ion mirrors under the influence of the first and second electric fields each time passing through the charge detection cylinder, wherein time spent by the at least one of the second processed ions passing through the charge detection cylinder is approximately equal to a sum of time spent by the at least one of the second processed ions travelling from a stopped position within one of the first and second ion passageways into a respective end of the charge detection cylinder and time spent by the at least one of the second processed ions traveling from an opposite respective end of the charge detection cylinder to a stopped position within the other of the first and second ion passageways.

DESCRIPTION OF THE ILLUSTRATIVE EMBODIMENTS

For the purposes of promoting an understanding of the principles of the disclosure, reference will now be made to a number of illustrative embodiments shown in the attached drawings and specific language will be used to describe the same.

Figure 1:
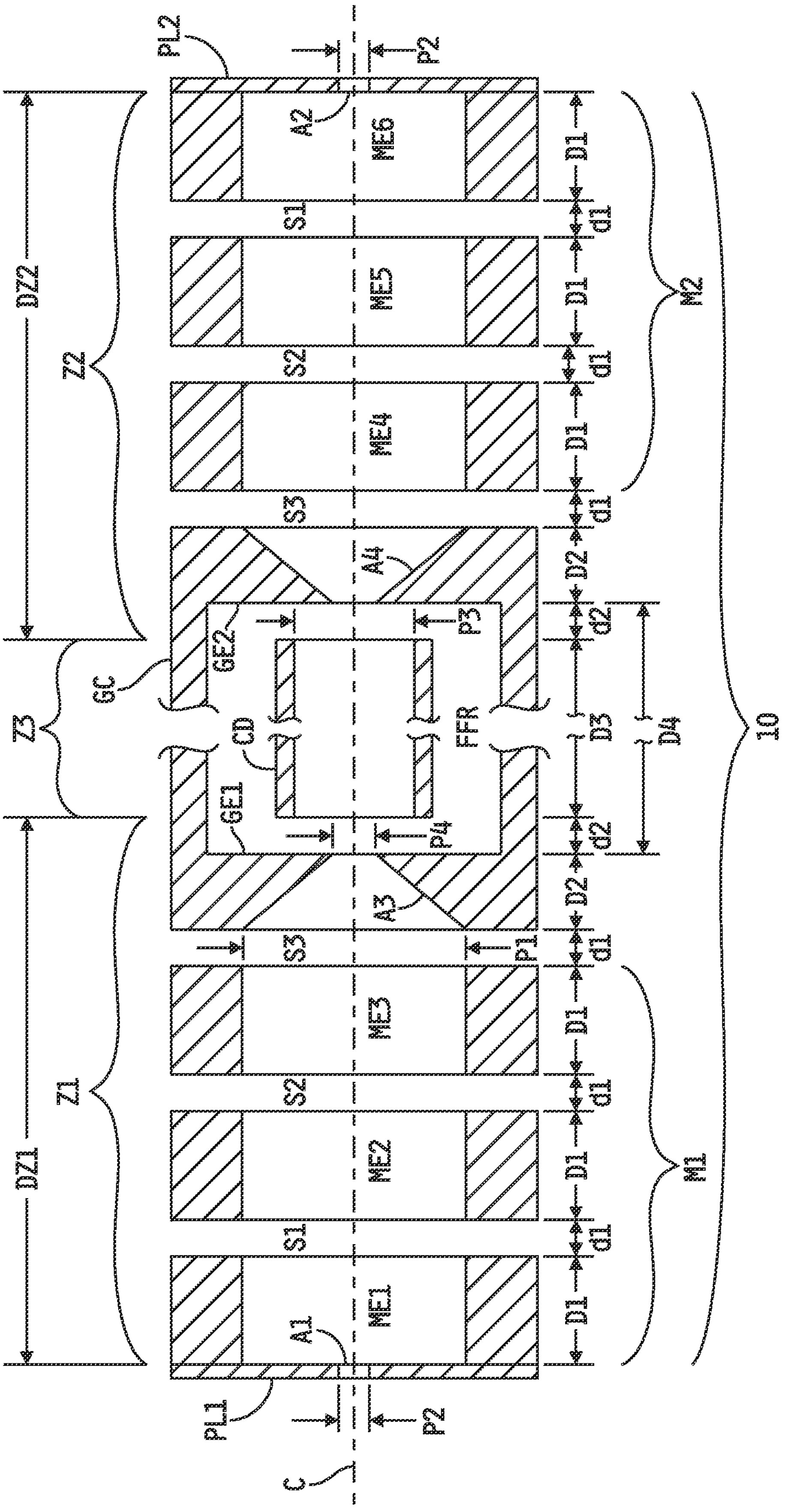
FIG. 1 is a simplified block diagram of an embodiment of an electrostatic linear ion trap (ELIT) illustrating dimensional information.

Referring to FIG. 1, a simplified block diagram is shown of an embodiment of an electrostatic linear ion trap (ELIT) 10. In the illustrated embodiment, the ELIT 10 includes a pair of ion mirrors M1, M2 with a charge detector CD positioned therebetween. As will be described in greater detail below, ions introduced into the ELIT 10 are made to oscillate between the ion mirrors M1, M2, each time passing through the charge detector CD. A plurality of charge and oscillation period values are measured at the charge detector CD, and the recorded results are processed to determine ion mass-to-charge ratio and ion mass values.

In the illustrated embodiment, the ion mirror M1 includes three spaced-apart, electrically conductive mirror electrodes ME1-ME3 with a plate or cover PL1 over the exposed face of the electrode ME1. The plate or cover PL1 defines an aperture A1 centrally therethrough which serves as an ion entrance to the ELIT 10. The spaces S1, S2 between the electrodes ME1, ME2 and ME2, ME3 respectively may be voids in some embodiments, and in other embodiments the spaces S1, S2 may be filled with one or more electrically non-conductive, e.g., dielectric, materials. The mirror electrodes ME1-ME3 are each illustratively of thickness D1 and define a cylindrical passageway therethrough of diameter P1. The mirror electrodes ME1-ME3 are axially aligned such that a longitudinal axis C passes centrally through each aligned cylindrical passageway and also centrally through the aperture A1. In embodiments in which the spaces S1, S2 include one or more electrically non-conductive materials, such materials will likewise define respective passageways therethrough which are axially aligned with the cylindrical passageways defined through the mirror electrodes ME1-ME3 and which have diameters of P1 or greater. In any case, the spaces S1, S2 each illustratively define a length d1 between opposing faces of the respective mirror electrodes ME1-ME3 such that the axial length, AL1, of the ion mirror M1 is AL1=3D1+2d1. The ion entrance A1 defined through the plate or cover PL1 illustratively has a diameter P2.

Another ion mirror M2 includes mirror electrodes ME4, ME5 and ME6 substantially identical in arrangement, construction and dimensions to the mirror electrodes ME1, ME2 and ME3 respectively of the ion mirror M1 as described above, and is spaced apart from the ion mirror M1 such that the distal face of the mirror electrode ME3 faces the distal face of the mirror electrode ME4. A plate or cover PL2 is disposed over the exposed face of the electrode ME6 of the ion mirror M2, and the plate or cover PL2 defines an aperture A2 centrally therethrough, also illustratively of diameter P2, which serves as an ion exit from the ELIT 10. The longitudinal axis C extends centrally through the passageways defined by the mirror electrodes ME4-ME6 and spaces S1, S2 of the mirror electrode M2 as illustrated in FIG. 1.

A charge detector CD in the form of an electrically conductive cylinder of length D3 is positioned between the spaced apart ion mirrors M1, M2. The charge detection cylinder CD illustratively defines a cylindrical passageway axially therethrough of diameter P3, and the charge detection cylinder CD is oriented relative to the ion mirrors M1, M2 such that the longitudinal axis C extending centrally through the passageways defined through the ion mirrors M1, M2 also extends centrally through the passageway defined through the charge detection cylinder CD. In some embodiments, as illustrated by example in FIG. 1, the charge detection cylinder CD is disposed within a field-free region FFR of a ground cylinder GC positioned between the ion mirrors M1, M2. A ground electrode GE1 of thickness D2 is defined at one end of the ground cylinder GC, and an external face of the ground electrode GE1 is illustratively spaced apart from the exposed face of the mirror electrode ME3 of the ion mirror M1 by a space S3 of length d1 (e.g., equal to the lengths of each of the spaces S1, S2). In alternate embodiments, the space S3 may have a length greater or lesser than d1. In any case, the ground electrode GE1 illustratively defines a conical aperture A3 therethrough which decreases linearly between the external and internal faces thereof from the same diameter P1 of the passageway defined through the mirror electrodes ME1-ME6 at the external face of GE1 to a reduced diameter P4 at the internal face of GE1. Another ground electrode GE2 also of thickness D2 is defined at an opposite end of the ground cylinder GC, and an external face of the ground electrode GE2 is illustratively spaced apart from the exposed face of the mirror electrode ME4 of the ion mirror M2 by a space S3 of length d1. In alternate embodiments, the space S3 may have a length greater or lesser than the length d1. In any case, the ground electrode GE2 also illustratively defines a conical aperture A4 therethrough which decreases linearly between the external and internal faces thereof from the same diameter P1 of the passageway defined through the mirror electrodes ME1-ME6 to the diameter P4 such that the ground electrodes GE1 and GE2 are identically configured. The internal or inner faces of the ground electrodes GE1 and GE2 are illustratively spaced apart from one another by a distance D4 which defines the length of the field free region FFR. In the illustrated embodiment, the charge detection cylinder CD is centered axially within the field free region FFR such that the opposite ends of the charge detection cylinder CD are each spaced apart from an inner face of a respective one of the ground electrodes GE1, GE2 by a distance d2.

The total axial length, TL, of the ELIT 10, not including the end plates or covers PL1, PL2, is TL=6D1+2D2+D3+6d1+2d2. In one specific example embodiment, the various dimensional parameters described above may have the numerical values set forth in the following TABLE I, although it will be understood that such numerical values are provided only by way of example and should not be considered limiting in any way.

TABLE I

| Dimensional Parameter | Numerical Value (millimeters) |
|---|---|
| D1 | 4.57 |
| D2 | 3.81 |
| D3 | 50.04 |
| D4 | 50.8 |
| d1 | 0.127 |
| d2 | 0.38 |
| P1 | 13.97 |
| P2 | 3.0 |
| P3 | 6.35 |
| P4 | 3.3 |

Figure 2:
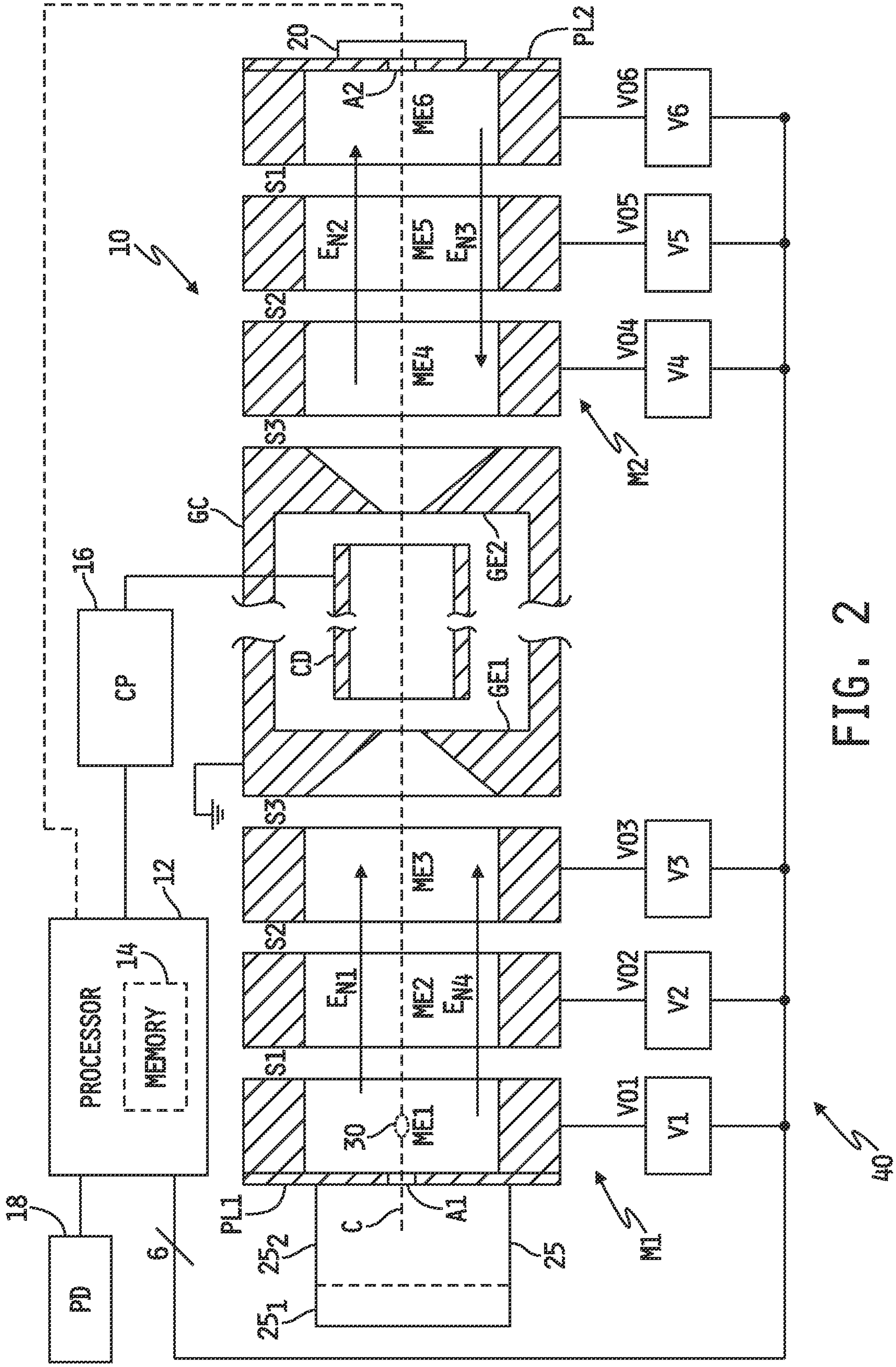
FIG. 2 is a simplified block diagram of the ELIT of FIG. 1 shown with an ion source and control and measurement components coupled thereto to form an embodiment of a charge detection mass spectrometer (CDMS).

Although the mirror electrodes ME1-ME6 of the ion mirrors M1, M2 are illustrated in FIGS. 1 and 2 and described above as defining cylindrical passageways therethrough of diameter P1, it will be understood that in alternate embodiments one or more of the mirror electrodes ME1-ME6 may define non-cylindrical passageways therethrough such that the variable P1 for such one or more mirror electrodes represents a cross-sectional area and profile that is not circular. Likewise, although the charge detection cylinder CD is illustrated in FIGS. 1 and 2 and described above as defining a cylindrical passageway therethrough of diameter P3, it will be understood that in alternate embodiments the passageway defined through the charge detection cylinder CD may be non-cylindrical such that the variable P3 in such embodiments represents a cross-sectional area and profile that is not circular. In still other embodiments, regardless of the shape of the cross-sectional profiles, the cross-sectional areas of the passageways defined through the mirror electrodes ME1-ME3 may be different from those of the passageways defined through the mirror electrodes ME4-ME6.

Referring now to FIG. 2, the ELIT 10 of FIG. 1 is shown along with an ion source 25 and electrical control and measurement components coupled thereto to form an embodiment of a charge detection mass spectrometer (CDMS) 40. In the illustrated embodiment, three voltage sources, V1, V2 and V3, are electrically connected to the mirror electrodes ME1, ME2, ME3 respectively of the ion mirror M1, and three voltage sources V4, V5, V6 are electrically connected to the mirror electrodes ME4, ME5, ME6 of the ion mirror M2. In some alternate embodiments, one or more of the mirror electrodes ME1, ME2, ME3 of the ion mirror M1 may share a voltage source with (a) corresponding one(s) of the mirror electrodes ME4, ME5, ME6 of the ion mirror M2. In any case, each voltage source V1-V6 is illustratively a switchable DC voltage source which may be programmed or controlled to selectively switch between programmable or controllable DC voltage levels. In the illustrated embodiment, the voltage sources V1-V6 are shown electrically connected to a conventional processor 12 including a memory 14 having instructions stored therein which, when executed by the processor 12, cause the processor 12 to control the voltage sources V1-V6 to selectively produce desired DC output voltages VO1-VO6 respectively. In some alternative embodiments, one or more of the voltage sources V1-V6 may be programmable to selectively produce desired output voltages. In other alternative embodiments, one or more of the voltage sources V1-V6 may be configured to produce a time-varying output voltage of any desired shape. It will be understood that more or fewer voltage sources may be electrically connected to the mirror electrodes M1, M2 in alternate embodiments. In any case, the ground chamber GC is illustratively grounded such that the ground electrodes GE1, GE2 are both at ground potential. In some alternate embodiments, either or both of the ground electrodes GE1, GE2 may be set to any desired DC reference potential, and in other alternate embodiments either or both of the ground electrodes GE1, GE2 may be electrically connected to a switchable DC or time-varying voltage source.

The charge detection cylinder CD is electrically connected to a signal input of a conventional charge pre-amplifier 16 (CP) having a signal output electrically connected to the processor 12. As an ion within the ELIT 10 oscillates back and forth between the ion mirrors M1, M2 as briefly described above, it passes each time through the charge detection cylinder CD where it induces at least a portion of its charge onto the charge detection cylinder CD. The charge pre-amplifier 16 is illustratively responsive to each such induced charge detected at its input to produce a corresponding amplified charge detection signal which is provided as an input to the processor 12. The processor 12 is illustratively operable to receive and digitize such charge detection signals produced by the charge pre-amplifier 16, and to store the digitized charge detection signals in the memory 14. The processor 12 is further illustratively coupled to one or more peripheral devices 18 for providing signal input(s) to the processor 12 and/or to which the processor 12 provides signal output(s). In some embodiments, the peripheral devices 18 include at least one of a conventional display monitor, a printer and/or other output device, and the memory 14 has instructions stored therein which, when executed by the processor 12, cause the processor 12 to control one or more such output peripheral devices 18 to display and/or record analyses of the stored, digitized charge detection signals. In some embodiments, a conventional microchannel plate detector 20 may be disposed at the ion outlet of the ELIT 10 and electrically connected to the processor 12 as shown by dashed-line representation in FIG. 2, and in such embodiments the microchannel plate detector 20 is operable to supply detection signals to the processor 12 corresponding to detected ions and/or neutrals.

As further illustrated in FIG. 2, an ion source 25 is coupled to the ion inlet of the ELIT 10, and the ion source 25 is configured to supply ions 30 to the ELIT 10 through the ion inlet A1 of the plate or cover PL1. In one example embodiment, the ion source 25 illustratively includes a source of ions $\mathbf{25_1}$ operatively coupled to a mass spectrometer $\mathbf{25_2}$. In this example embodiment, the source of ions $\mathbf{25_1}$ is illustratively configured and operable in a conventional manner to generate and supply ions to the mass spectrometer $\mathbf{25_2}$, and the mass spectrometer $\mathbf{25_2}$ is configured and operable in a conventional manner to separate ions as a function of ion mass-to-charge ratio such that ions 30 supplied to the ELIT 10 are those exiting the mass spectrometer $\mathbf{25_2}$. Conventionally, CDMS is a single-particle measurement technique in which charge and mass-to-charge ratio values are measured for individual charged particles, i.e., individual ions, and in which such measurements for multiple ions are then collected and used to produce mass and charge spectral information for the sample from which the ions are generated. In the CDMS 40 illustrated in FIG. 2 operating as such a single-particle measurement instrument, the ELIT 10 is illustratively controlled, as described in further detail below, in a manner which favors trapping therein of individual ions exiting the mass spectrometer $\mathbf{25_2}$. Charges induced on the charge detection cylinder CD, as the trapped ion oscillates in the ELIT 10 between the ion mirrors M1, M2, are detected by the charge preamplifier CP, and the corresponding charge detection signals produced by the charge preamplifier CP are processed by the processor 12 to determine the ion's charge and mass-to-charge ratio from which the ion's mass can then be computed.

In the example embodiment illustrated in FIG. 2 in which the ion source 25 includes a source of ions $\mathbf{25_1}$ coupled to an ion inlet of a mass spectrometer $\mathbf{25_2}$, the mass spectrometer $\mathbf{25_2}$ may be of any conventional design including, for example, but not limited to a time-of-flight (TOF) mass spectrometer, a reflectron mass spectrometer, a Fourier transform ion cyclotron resonance (FTICR) mass spectrometer, a quadrupole mass spectrometer, a multi-quadrupole mass spectrometer, a sector mass spectrometer, such as a magnetic sector mass spectrometer, or the like. The source of ions $\mathbf{25_1}$ may illustratively be or include any conventional ion source for supplying ions to the mass spectrometer $\mathbf{25_2}$ including for example, but not limited to, one or any combination of at least one ion generating device such as an electrospray ionization source, a matrix-assisted laser desorption ionization (MALDI) source or the like. In some embodiments, the ion source 25 may further illustratively include other ion processing instruments or stages prior to, i.e., upstream of, the source of ions $\mathbf{25_1}$, between the source of ions $\mathbf{25_1}$ and the mass spectrometer $\mathbf{25_2}$ and/or between the mass spectrometer $\mathbf{25_2}$ and the ELIT 10. Examples of such other ion processing instruments or stages may include, but are not limited to, one or any combination of one or more molecular separation instruments configured to separate ions over time as a function of at least one molecular characteristic, such as an ion mobility spectrometer, another mass spectrometer, a liquid or gas chromatograph, or the like, one or more instruments for collecting and/or storing ions (e.g., one or more quadrupole, hexapole and/or other ion traps), one or more instruments for filtering ions (e.g., according to one or more molecular characteristics such as ion mass, charge, ion mass-to-charge, ion mobility, ion retention time and the like), one or more instruments for fragmenting or otherwise dissociating ions, one or more instruments for normalizing or shifting ion charge states, and the like. In any case, as briefly described above and as illustrated by example in FIG. 2, an ion 30 introduced into the ELIT 10 from the ion source 25 is made to oscillate between the ion mirrors M1, M2, each time passing through the charge detector CD, and the resulting charges induced by the ion 30 on the charge detection cylinder CD are detected by the charge preamplifier 16. The corresponding charge detection signals produced by the charge preamplifier CP are then processed by the processor 12 to determine ion mass-to-charge ratio and ion mass values. As will be described in greater detail below, the ion 30 is trapped within the ELIT 10 and made to oscillate between the ion mirrors M1, M2 thereof by selectively controlling the voltage sources V1-V6 to establish electric fields within and between the mirror electrodes ME1-ME3 of each ion mirror M1, M2 for selectively transmitting ions therethrough and for selectively reflecting ions therefrom back toward the opposite ion mirror M1, M2.

Figure 3:
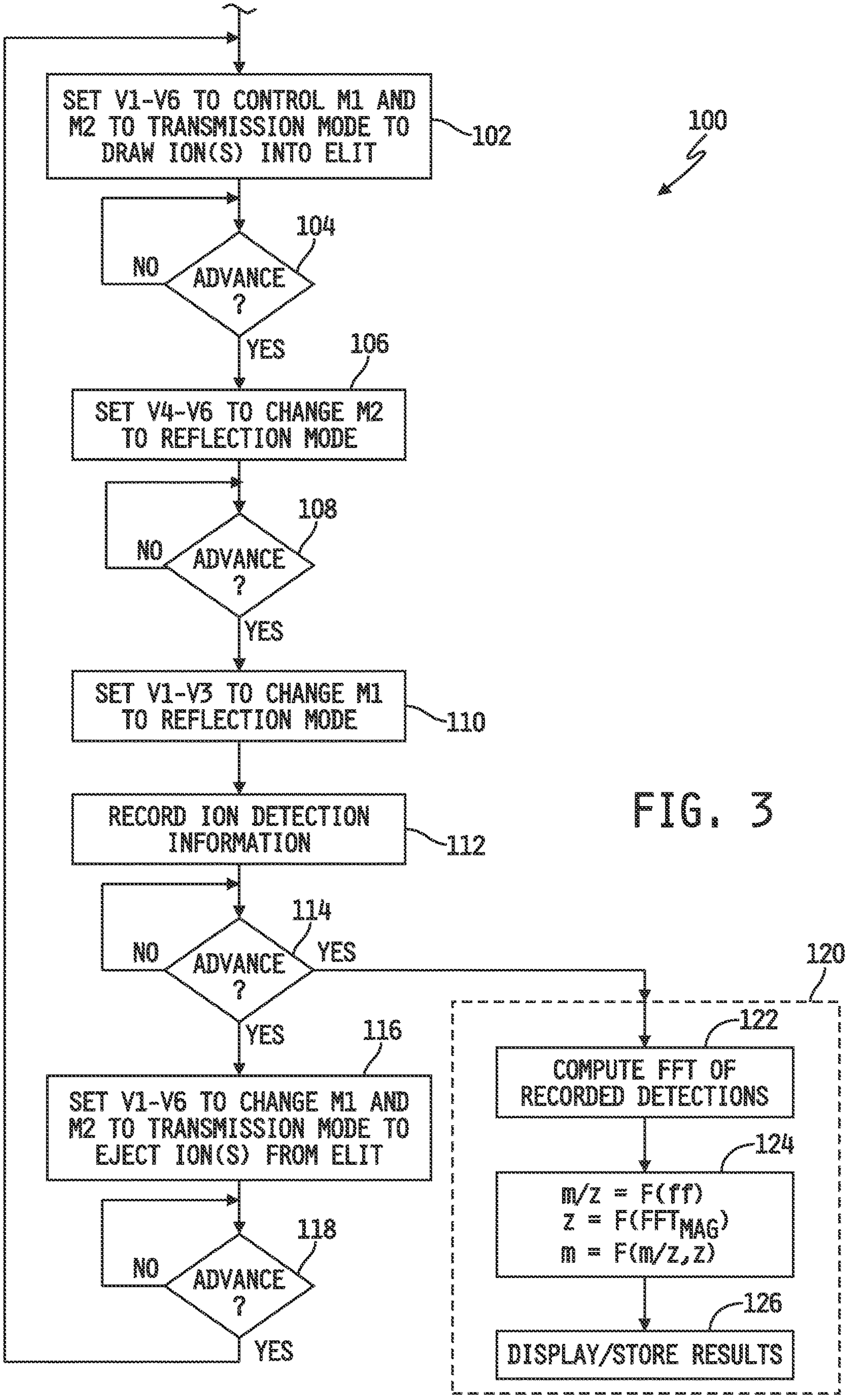
FIG. 3 is a simplified flowchart illustrating an embodiment of a process for controlling operation of the ELIT of FIGS. 1 and 2 to determine ion mass and charge information.

Referring now to FIG. 3, a simplified flowchart is shown illustrating an embodiment of a process 100 for controlling the voltage sources V1-V6 to trap an ion 30 supplied by the ion source 25 within the ELIT 10 and to cause the trapped ion 30 to oscillate back and forth between the ion mirrors M1, M2, and for processing recorded charge detection signals to determine ion charge, ion mass-to-charge ratio and ion mass values. In the illustrated embodiment, the process 100 is illustratively stored in the memory 14 in the form of instructions which, when executed by the processor 12, cause the processor 12 to perform the stated functions. In alternate embodiments in which one or more of the voltage sources V1-V6 is/are programmable independently of the processor 12, one or more aspects of the process 100 may be executed in whole or in part by the one or more of the programmable voltage sources V1-V6. For purposes of this disclosure, however, the process 100 will be described as being executed solely by the processor 12. The process 100 will further be described as operating on a positively charged ion 30, although it will be understood that the process 100 may alternatively operate on a negatively charged ion.

With reference to FIGS. 2 and 3, the process 100 begins at step 102 where the processor 12 is operable to control one or more of the voltage sources V1-V6 to set the voltages VO1-VO6 in a manner which causes each of the ion mirrors M1 and M2 to operate in a "transmission mode" in which each of the ion mirrors M1, M2 operates to pass ions therethrough. Such control of the ion mirrors M1 and M2 to their respective transmission modes causes the ion 30 supplied by the ion source 25 to pass completely through the ELIT 10 as at least partially depicted in FIG. 2. Illustratively, the output voltages VO1-VO3 produced by the voltage sources V1-V3 respectively are controlled by the processor 12 at step 102 to establish a net "transmission" electric field $E_{N1}$ in the ion mirror M1 which focusses the ion 30 passing into the ion mirror M1 toward the longitudinal axis C extending centrally through the ELIT 10. As a result of this focusing effect of the ion transmission electric field $E_{N1}$, the ion 30 exiting M1 attains a narrow trajectory through the charge detector CD, i.e., close to the longitudinal axis C, and into the ion mirror M2. The output voltages VO4-VO6 produced by the voltage sources V4-V6 respectively are likewise illustratively controlled at step 102 to establish a net "transmission" electric field $E_{N2}$ in the ion mirror M2, identical or similar to the ion transmission electric field $E_{N1}$, which focuses the ion 30 toward the longitudinal axis C such that the ion 30 passes through the ion mirror M2 and then through the exit aperture A2 defined in the plate PL2.

Following step 102, the process 100 advances to step 104 where the processor 12 is operable to pause and determine when to advance to step 106. In one embodiment, the processor 12 is operable at step 104 to pause for a predefined or programmable time period to allow ions exiting the ion source 25 to enter and pass through the ELIT 10. As one non-limiting example, the selected time period which the processor 12 spends at step 104 before moving on to step 106 is on the order of 1 millisecond (ms), although it will be understood that such selected time period may, in other embodiments, be greater than 1 ms or less than 1 ms. Until the selected time period has elapsed, the process 100 follows the NO branch of step 104 and loops back to the beginning of step 104. After passage of the selected time period, the process 100 follows the YES branch of step 104 and advances to step 106. In some alternate embodiments of step 104, such as in embodiments which include the microchannel plate detector 20, the processor 12 may be operable to control the voltage sources V1-V6 to hold the ion mirrors M1, M2 in their transmission modes until at least one ion 30 is detected at the microchannel plate detector 20. Until such detection, the process 100 follows the NO branch of step 104 and loops back to the beginning of step 104.

Following the YES branch of step 104, the processor 12 is operable at step 106 to control the voltage sources V4-V6 to set the output voltages VO4-VO6 in a manner which changes or switches the operation of the ion mirror M2 from transmission mode of operation to a "reflection mode" of operation in which the ion mirror M2 operates to "reflect" an ion contained therein back toward the ion mirror M1 (and through the charge detector CD) by first decelerating and stopping the ion, and then accelerating the ion back in the opposite direction while focusing the ion toward the longitudinal axis C such that the ion passes in a narrow trajectory about the longitudinal axis C from the ion mirror M2 back toward the ion mirror M1. Illustratively, the output voltages VO4-VO6 produced by the voltage sources V4-V6 respectively are controlled by the processor 12 at step 106 to establish a net "reflection" electric field $E_{N3}$ in the ion mirror M2 oriented to reflect the ion 30 entering therein from the charge detector CD back toward the ion mirror M1 (and through the charge detector CD) as illustrated by example in FIG. 2. Illustratively, the output voltages VO1-VO3 produced by the voltage sources V1-V3 respectively are unchanged at step 106 so that the ion mirror M1 remains in its transmission mode to allow one or more additional ions 30 to enter into the ion mirror M1 from the mass spectrometer 25 or other ion source. In such embodiments, the process 100 advances from step 106 to step 108 where the processor 12 is operable to pause and determine when to advance to step 110.

In one embodiment of step 108, the ELIT 10 is illustratively controlled in a "random trapping mode" in which the ion mirror M2 is held in the reflection mode and the ion mirror M1 is held in the transmission mode for a selected time period as one or more ions 30 enter the ion mirror M1 from the ion source 25. As one non-limiting example, the selected time period which the processor 12 spends at step 108 before moving on to step 110 is on the order of 1 millisecond (ms), although it will be understood that such selected time period may, in other embodiments, be greater than 1 ms or less than 1 ms. Until the selected time period has elapsed, the process 100 follows the NO branch of step 108 and loops back to the beginning of step 108. After passage of the selected time period, the process 100 follows the YES branch of step 108 and advances to step 110.

In some alternate embodiments of step 108, the ELIT 10 may illustratively be controlled by the processor 12 in a first version of a "trigger trapping mode" in which the ion mirror M1 is held in the transmission mode and the ion mirror M2 is held in the reflection mode until an ion 30 is detected by the charge detector CD. Until such detection, the process 100 follows the NO branch of step 108 and loops back to the beginning of step 108. Detection by the processor 12 of the ion by the charge detector CD serves as a trigger event which causes the processor 12 to follow the YES branch of step 108 and advance to step 110 of the process 100. In this version of the trigger trapping mode, the detected ion serving as the trigger event may be an ion entering the ELIT 10 from the ion source 25 and passing through the charge detection cylinder CD toward the ion mirror M2, or an ion reflected by the ion mirror M2 and passing back through the charge detection cylinder CD toward the ion mirror M1.

In a second version of the "trigger trapping mode," steps 104 and 106 may be omitted, and detection by the processor 12 of an ion by the charge detector CD at step 108 again serves as a trigger event which causes the processor 12 to follow the YES branch of step 108 and advance to step 110. In this version of the trigger trapping mode, the ion mirrors M1, M2 are both in transmission mode such that the detected ion serving as the trigger event may only be an ion entering the ELIT 10 from the ion source 25 and passing through the charge detection cylinder CD toward the ion mirror M2.

Following the YES branch of step 108 in any of the trapping modes described above, the processor 12 is operable at step 110 to control the voltage sources V1-V3 to set the output voltages VO1-VO3 in a manner which changes or switches the operation of the ion mirror M1 from transmission mode of operation to the reflection mode of operation in which the ion mirror M1 operates to reflect an ion contained therein back toward the ion mirror M2 (and through the charge detector CD). Illustratively, the output voltages VO1-VO1 produced by the voltage sources V1-V3 respectively are controlled by the processor 12 at step 110 to establish a net "reflection" electric field $E_{N4}$ in the ion mirror M1, which is identical or similar to the ion reflection electric field $E_{N3}$ established within the ion mirror M2, and which is oriented to reflect the ion 30 entering therein from the charge detector CD back toward the ion mirror M2 (and through the charge detector CD) as illustrated by example in FIG. 2. The output voltages VO4-VO6 produced by the voltage sources V4-V6 are unchanged at step 110 so that the net electric field $E_{N3}$ remains in the ion mirror M2 so as to maintain the ion mirror M2 in the reflection mode of operation. At step 110, the ion 30 is trapped within the ELIT 10, and with both of the ion mirrors M1 and M2 operating in the reflection modes the ion 30 traversing the length of the ELIT 10 is reflected by each of the respective ion reflection electric fields $E_{N3}$ and $E_{N4}$ in a manner which enables the ion 30 to oscillate back and forth between the ion mirrors M1 and M2, each time passing through the charge detector CD along a narrow trajectory about the central longitudinal axis C of the ELIT 10.

Following step 110, the process 100 advances to step 112 where, as the ion is oscillating within the ELIT 10 back and forth between the ion mirrors M1, M2 during a "detection phase," detection by the charge preamplifier CP of the charge induced on the charge detector CD by each passage of the ion therethrough (hereinafter referred to as a "charge detection event") is recorded, i.e., stored in the memory 14, by the processor 12. Illustratively, the detection information recorded at step 112 includes amplitude and timing information, i.e., the amplitudes of each charge detection signal as well as the time of each charge detection signal relative to a reference time and/or relative to a time of a previous charge detection signal.

Following step 112, the process 100 advances to step 114 where the processor 12 is operable to pause and determine when to advance to step 114. In one embodiment, the processor 12 is configured, i.e. programmed, to allow the ion(s) to oscillate through the ELIT 10 back and forth between the ion mirrors M1, M2 during the detection phase for a selected time period during which charge detection events are recorded by the processor 12. As one non-limiting example, the selected time period which the processor 12 spends in the detection phase at step 114 before moving on to step 116 is on the order of 100 millisecond (ms), although it will be understood that such selected time period may, in other embodiments, be greater than 100 ms or less than 100 ms. Until the selected time period has elapsed, the process 100 follows the NO branch of step 114 and loops back to the beginning of step 114. After passage of the selected time period, the process 100 follows the YES branch of step 114 and advances to step 116. In some alternate embodiments of step 114, the ELIT 10 may illustratively be controlled by the processor 12 to allow the ion(s) to oscillate back in forth through the charge detector CD during the detection phase a selected number of times during which charge detection events are recorded by the processor 12. Until the processor counts the selected number charge detection events, the process 100 follows the NO branch of step 114 and loops back to the beginning of step 114. Detection by the processor 12 of the selected number of charge detection events serves as a trigger event which causes the processor 12 to follow the YES branch of step 114 and advance to step 116 of the process 100.

Following the YES branch of step 114, the processor 12 is operable at step 116 to control the voltage sources V1-V6 to set the output voltages VO1-VO6 in a manner which changes or switches the operation of both of the ion mirrors M1 and M2 from reflection mode of operation to the transmission mode of operation in which the ion mirrors M1, M2 each operate to allow passage of ions therethrough. Illustratively, the output voltages VO1-VO6 produced by the voltage sources V1-V6 respectively are controlled by the processor 12 at step 116 to re-establish net electric fields $E_{N1}$ and $E_{N2}$ in the ion mirrors M1, M2 as described above and as illustrated in FIG. 2. Thereafter at step 118, the processor 12 is programed to pause for a selected time period to allow the ions contained within the ELIT 10 to exit. As one non-limiting example, the selected time period which the processor 12 spends at step 118 before looping back to step 102 to restart the process 100 is on the order of 1 millisecond (ms), although it will be understood that such selected time period may, in other embodiments, be greater than 1 ms or less than 1 ms. Until the selected time period has elapsed, the process 100 follows the NO branch of step 118 and loops back to the beginning of step 118. After passage of the selected time period, the process 100 follows the YES branch of step 118 and loops back to step 102 to restart the process 100.

As described above, each detection by the charge preamplifier CP of a charge induced on the charge detector CD by passage of an ion therethrough is referred to as a "charge detection event." As the ion oscillates back and forth between the ion mirrors M1, M2, multiple charge detection events are recorded. The total number of oscillations allowed before the process 100 advances from step 114 to step 116, or the total time allowed between step 110 and advancement of the process 100 from step 114, is referred to an ion trapping event. By either definition, the ion 30 oscillates back and forth between the ion mirrors M1, M2 for a "total trapping time" of an ion trapping event during which multiple charge detection events are recorded.

Following another YES branch of step 114, the process 100 additionally advances to step 120 to analyze the data collected during the ion trapping event just described. In the illustrated embodiment, the data analysis step 120 illustratively includes step 122 where the processor 12 is operable to compute a Fourier transform of the collected set of stored charge detection signals recorded during the ion trapping event. The processor 12 is illustratively operable to execute step 122 using any conventional digital Fourier transform (DFT) technique such as for example, but not limited to, a conventional Fast Fourier Transform (FFT) algorithm. Following step 122, the process 100 advances to step 124 where the processor 12 is operable to compute values of ion mass-to-charge ratio (m/z) and ion charge (z), each as a function of the computed FFT, and thereafter at step 126 the processor 12 is operable to store the computed results in the memory 14 and/or to control one or more of the peripheral devices 18 to display the results for observation and/or further analysis.

It is generally understood that the mass-to-charge ratio (m/z) of an ion 30 oscillating in an ELIT is inversely proportional to the square of the fundamental frequency ff of the oscillating ion 30 according to the equation:

$$m/z=C/ff^2,$$

where C is a constant that is a function of the ion energy and also a function of the dimensions of the ELIT. Typically, C is determined using conventional ion trajectory simulations. In any case, the value of the ion charge, z, is proportional to the magnitude of the fundamental frequency of the FFT, taking into account the number of ion oscillation cycles. Ion mass, m, is then calculated as a product of m/z and z. In some cases, the magnitude(s) of one or more of the harmonic frequencies of the FFT may be added to the magnitude of the fundamental frequency for purposes of determining the ion charge, z.

Multiple, e.g., hundreds or thousands or more, ion trapping events are typically carried out for any particular sample from which the ions are generated by the ion source 25, and ion mass-to-charge, ion charge and ion mass values are determined/computed for each such ion trapping event at step 120 of the process 100. The ion mass-to-charge, ion charge and ion mass values for such multiple ion trapping events are, in turn, combined to form spectral information relating to the sample. Such spectral information may illustratively take different forms, examples of which include, but are not limited to, ion count vs. mass-to-charge ratio, ion charge vs. ion mass (e.g., in the form of an ion charge/mass scatter plot), ion count vs. ion mass, ion count vs. ion charge, or the like.

Generally, uncertainty in the determination of ion mass with an ELIT depends on the uncertainties in the m/z and z measurements. In the process 100 just described, the measured m/z values are inversely proportional to the square of the fundamental frequency, ff, and the measured charge values are proportional to the magnitude of the FFT fundamental frequency. It has been determined through simulation and experimentation that because the measured charge values are proportional to the magnitude of the fundamental frequency, ff, of the oscillating charge detection signal, uncertainty in the charge measurements can be reduced by increasing the signal-to-noise ratio of the fundamental frequency ff of the oscillating charge detection signal relative to one or more harmonics of the oscillating charge detection signal.

Figures 4A, 4B:
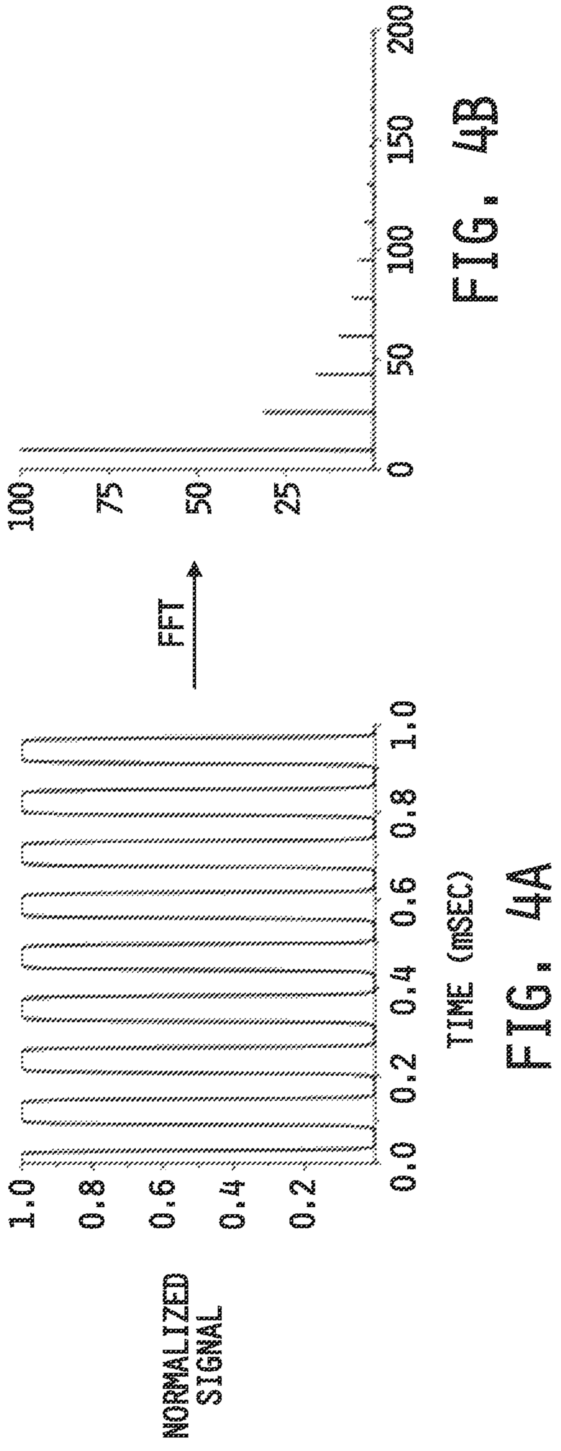
FIG. 4A is a plot of a normalized time-domain detection signal resulting from the ELIT of FIGS. 1 and 2 operating with approximately a 50% duty cycle.
FIG. 4B is a plot of relative FFT magnitude vs. oscillation frequency illustrating an FFT of the detection signal of FIG. 4A.

The oscillating charge detection signal just described is substantially a square-wave signal having a duty cycle, DC, defined as a ratio of the time spent by the ion 30 in the charge detection cylinder CD and the time spent by the ion 30 traversing the entire ELIT during one oscillation cycle. In particular, and referring again to FIG. 1, the duty cycle, DC, is the ratio of the time spent by the ion 30 in the zone Z3 and the time spent by the ion 30 traversing the sum of the zones Z1 through Z3 during one oscillation cycle. The length DZ1 and DZ2 of each of the zones Z1 and Z2 is the same and is given by DZ1=DZ2=3D1+D2+3d1+d2, and the length of the zone Z3 is D3. The time spent by an ion 30 traversing the distance DZ1 of Z1 as the ion is reflected by M1 toward M2 is $T_{DZ11}$, the time spent by the ion 30 passing through the distance D3 following reflection by M1 through DZ1 is $T_{Z31}$, and the time spent by the ion 30 traversing the distance DZ2 of Z2 after emerging from the charge detector CD is $T_{DZ21}$. Similarly, the time spent by the ion 30 traversing the distance DZ2 of Z2 as the ion is reflected by M2 back toward M1 is $T_{DZ22}$, the time spent by the ion 30 passing through the distance D3 following reflection by M2 through DZ2 is $T_{Z32}$, and the time spent by the ion 30 traversing the distance DZ1 of Z1 after emerging from the charge detector CD is $T_{DZ12}$. The duty cycle for the ELIT 10 illustrated in FIG. 1 is thus $DC=(T_{Z31}+T_{Z32})/(T_{DZ11}+T_{Z31}+T_{DZ21}+T_{DZ22}+T_{Z32}+T_{DZ12})$ Referring to FIGS. 4A and 4B, it is generally understood in the signal waveform analysis art that square-wave signals having a 50% duty cycle produce only odd-valued signal harmonics. Applying this relationship to the control of the ELIT 10 illustrated in FIG. 2, the output voltages VO1-VO6 of the voltage sources V1-V6 are illustratively controlled, taking into account the dimensions of the ELIT 10 illustrated in FIG. 1, to establish the ion reflection electric fields, i.e., the electric field $E_{N3}$ of the ion mirror M2 operating in reflection mode and the electric field $E_{N4}$ also operating in reflection mode, in a manner which results in an oscillating charge detection signal having a duty cycle of approximately 50%. Because a 50% duty cycle square wave does not have any even-numbered harmonic frequency components, fewer harmonic frequency components will thus be included in the FFT computed by the processor 12 at step 114 as compared to that of an oscillating charge detection signal having a duty cycle other than 50%. Fewer such harmonic frequency components will yield a higher magnitude fundamental frequency peak and, since the ion charge value computed by the processor 12 at step 120 is proportional to the magnitude of the fundamental frequency ff, uncertainty in the ion charge measurement value will accordingly be reduced due to the increases signal-to-noise ratio of the fundamental frequency peak relative to the harmonics. Operating the ELIT 10 with an oscillating charge detection signal having a duty cycle at or near 50% so as to include fewer harmonic frequency components, i.e., to specifically exclude even-numbered harmonics, further illustratively reduces effects of ion kinetic energy spread on the fundamental frequency so as to also reduce uncertainty in the ion mass-to-charge measurement values.

In order to achieve a 50% duty cycle, the time spent by an ion 30 traversing the distance DZ1+Z3+DZ2 must be equal to the time spent by the ion 30 traversing the distance DZ2+Z3+DZ1 in the opposite direction. The duty cycle equation set forth in the previous paragraph thus simplifies to $DC=T_{Z3}/(T_{DZ1}+T_{Z3}+T_{DZ2})$, where $T_{Z3}$ is the time spent by the ion 30 traversing D3 in either direction, $T_{DZ1}$ is the time spent by the ion 30 travelling through each of DZ1 and DZ2 toward the other and $T_{DZ2}$ is the time spent by the ion 30 traveling into each of DZ1 and DZ2 prior to being reflected, i.e., prior to changing directions under the influence of the net electric fields $E_{N4}$ and $E_{N3}$ respectively. Moreover, the requirement DC=½ results in $T_{Z3}=T_{DZ1}+T_{DZ2}$, such that, during each single-direction pass through the ELIT 10, the time spent by the ion 30 passing each through the charge detection cylinder CD should be approximately equal to the sum of the time spent reflecting the ion 30 from a stopped state in one of the ion mirrors M1, M2 to the respective end or entrance of the charge detection cylinder CD and the time spent by the ion exiting the opposite end of the charge detection cylinder CD and traveling toward and into the other ion mirror M1, M2 to a stopped state.

Figure 5:
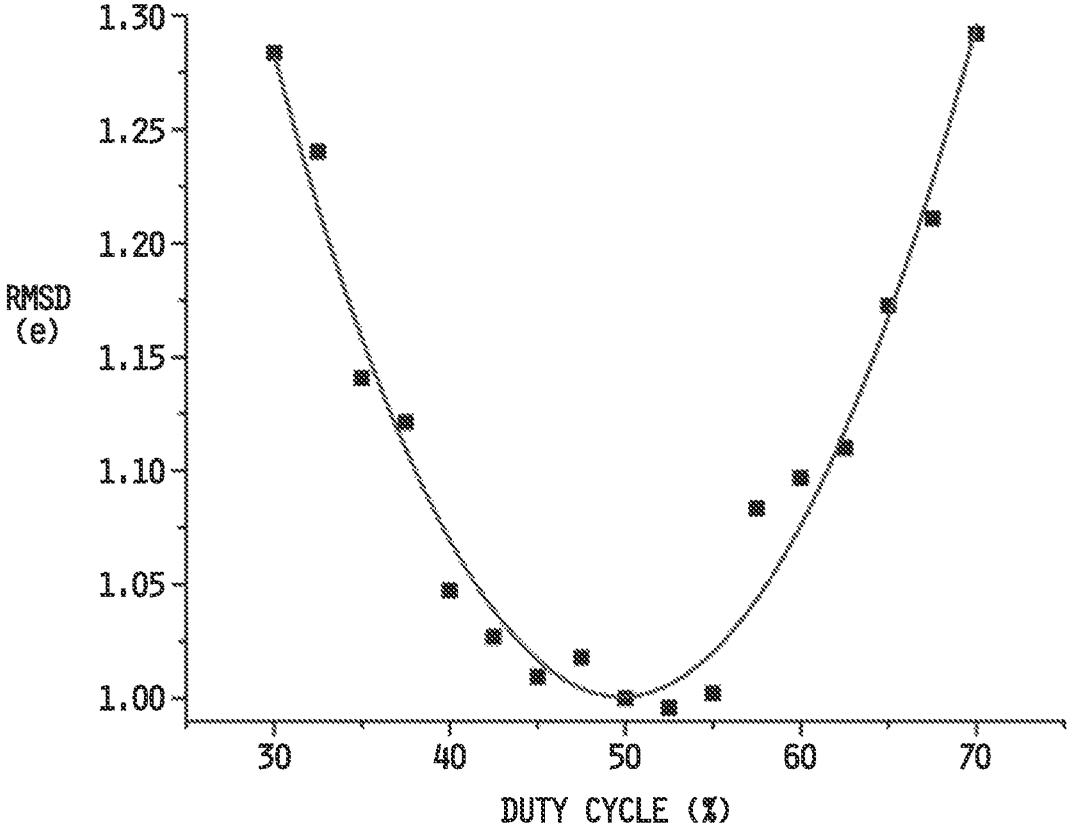
FIG. 5 is a plot of simulated ion charge measurement uncertainty as a function of duty cycle for the ELIT illustrated in FIGS. 1 and 2.

Referring now to FIG. 5, a plot is shown of simulated charge measurement error RMSD(e) vs. duty cycle in which the duty cycle, DC, of the ELIT 10 having the example dimensions illustrated in the above TABLE I was varied between 30 and 70%. As the plot illustrates, uncertainty in the ion charge measurement of an oscillating charge detection signal has a minimum value at a duty cycle of approximately 50%.

Referring again to FIGS. 2 and 3, the processor 12 is illustratively operable at steps 102, 106, 110 and 116 to control the output voltages VO1-VO6 produced by the voltage sources V1-V6 in a manner which establishes the net electric fields $E_{N1}$-$E_{N4}$ described above, taking into account the dimensions of the ELIT 10, particularly, but not exclusively, the axial lengths DZ1, DZ2 and Z3 and the cross-sectional areas, e.g., radial diameters, P1 and P3, that results in approximately a 50% duty cycle of the oscillating charge detection signal. Using the example dimensions of the ELIT 10 illustrated in TABLE I above, one example set of output voltages VO1-VO6 produced by the voltage sources V1-V6 respectively at each of the four steps 102, 106, 110 and 116 is shown in TABLE II below. It will be understood that the following values of VO1-VO6 are provided only by way of example, and that other values of VO1, VO2, VO3, VO4, VO5 and/or VO6 at one or more of the steps 102, 106, 110, 116 may alternatively be used.

TABLE II

| Step of Process 100 | Output Voltages (volts DC) |
|---|---|
| 102 | VO1 = VO6 = 0<br>VO2 = VO5 = 135<br>VO3 = VO4 = 95 |
| 106 | VO1 = 0 |

TABLE II-continued

| Step of Process 100 | Output Voltages (volts DC) |
|---|---|
| | VO2 = VO5 = 135 |
| | VO3 = 95 |
| | VO4 = 125 |
| | VO6 = 190 |
| 110 | VO1 = VO6 = 190 |
| | VO2 = VO5 = 135 |
| | VO3 = VO4 = 125 |
| 116 | VO1 = VO6 = 0 |
| | VO2 = VO5 = 135 |
| | VO3 = VO4 = 95 |

Figure 6A:
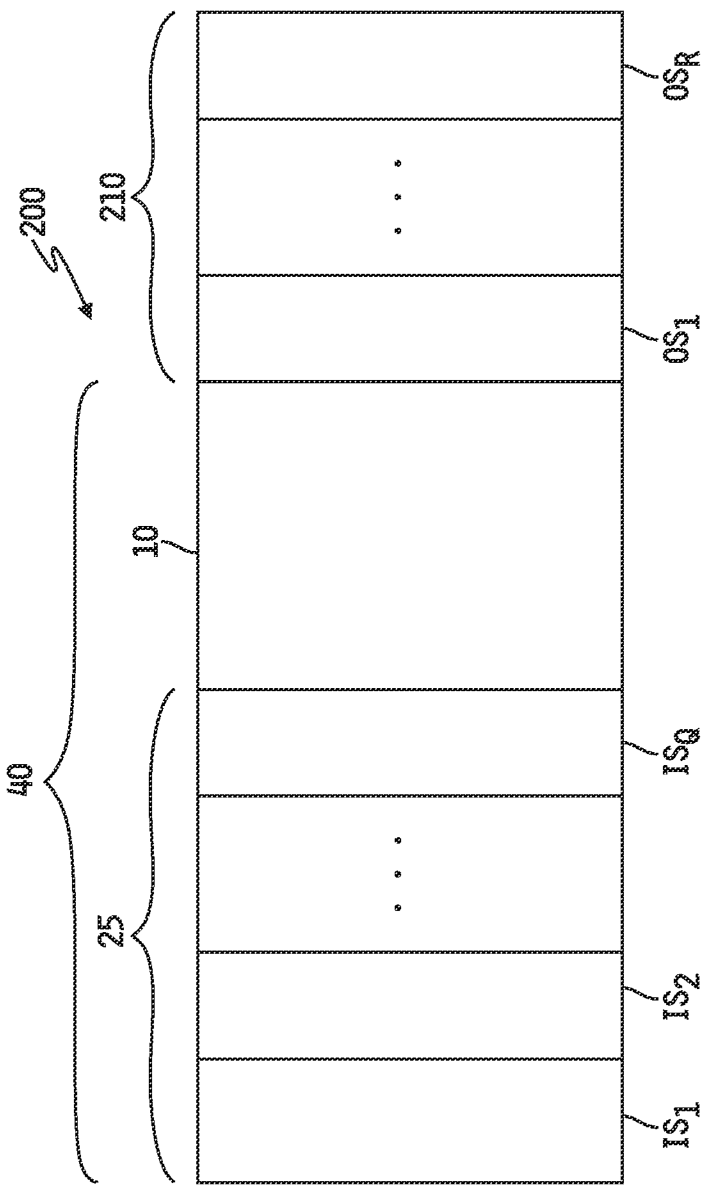
FIG. 6A is a simplified block diagram of an embodiment of an ion separation instrument including the ELIT illustrated in FIGS. 1-2 and operating as described herein, showing example ion processing instruments which may form part of the ion source upstream of the ELIT and/or which may be disposed downstream of the ELIT to further process ion(s) exiting the ELIT.

Referring now to FIG. 6A, a simplified block diagram is shown of an embodiment of an ion, i.e., charged particle, separation instrument 200 which may include the ELIT 10 configured and operable as described herein, which may include the CDMS 40 configured and operable as described herein, which may include any number of ion processing instruments forming part of the ion source 25 upstream of the ELIT 10 and/or which may include any number of ion processing instruments disposed downstream of the ELIT 10 to further process ions exiting the ELIT 10. In this regard, the ion source 25 is illustrated in FIG. 6A as including a number, Q, of ion source stages $IS_1$-$IS_Q$ which may be or form part of the ion source 25 described in one form above with respect to FIG. 2, where Q may be any positive integer. Alternatively or additionally, an ion processing instrument 210 is illustrated in FIG. 6A as being coupled to the ion outlet of the ELIT 10, wherein the ion processing instrument 210 may include any number of ion processing stages $OS_1$-$OS_R$, where R may be any positive integer.

Focusing on the ion source 25, it will be understood that the source 25 of ions entering the ELIT 10 may be or include, in the form of one or more of the ion source stages $IS_1$-$IS_Q$, one or more conventional sources of ions as described above, and may further include one or more conventional instruments for separating ions according to one or more molecular characteristics (e.g., according to ion mass, ion mass-to-charge, ion mobility, ion retention time, or the like) and/or one or more conventional ion processing instruments for collecting and/or storing ions (e.g., one or more quadrupole, hexapole and/or other ion traps), for filtering ions (e.g., according to one or more molecular characteristics such as ion mass, ion mass-to-charge, ion mobility, ion retention time and the like), for fragmenting or otherwise dissociating ions, for normalizing or shifting ion charge states, and the like. It will be understood that the ion source 25 may include one or any combination, in any order, of any such conventional ion sources, ion separation instruments and/or ion processing instruments, and that some embodiments may include multiple adjacent or spaced-apart ones of any such conventional ion sources, ion separation instruments and/or ion processing instruments. In any implementation which includes one or more mass spectrometers, any one or more such mass spectrometers may be implemented in any of the forms described above with respect to FIG. 2.

Turning now to the ion processing instrument 210, it will be understood that the instrument 210 may be or include, in the form of one or more of the ion processing stages $OS_1$-$OS_R$, one or more conventional instruments for separating ions according to one or more molecular characteristics (e.g., according to ion mass, ion mass-to-charge, ion mobility, ion retention time, or the like) and/or one or more conventional ion processing instruments for collecting and/or storing ions (e.g., one or more quadrupole, hexapole and/or other ion traps or guides), for filtering ions (e.g., according to one or more molecular characteristics such as ion mass, ion mass-to-charge, ion mobility, ion retention time and the like), for fragmenting or otherwise dissociating ions, for normalizing or shifting ion charge states, and the like. It will be understood that the ion processing instrument 210 may include one or any combination, in any order, of any such conventional ion separation instruments and/or ion processing instruments, and that some embodiments may include multiple adjacent or spaced-apart ones of any such conventional ion separation instruments and/or ion processing instruments. In any implementation which includes one or more mass spectrometers, any one or more such mass spectrometers may be implemented in any of the forms described above with respect to FIG. 2.

As one specific implementation of the ion separation instrument 200 illustrated in FIG. 6A, which should not be considered to be limiting in any way, the ion source 25 illustratively includes 3 stages, and the ion processing instrument 210 is omitted. In this example implementation, the ion source stage $IS_1$ is a conventional source of ions, e.g., electrospray, MALDI or the like, the ion source stage $IS_2$ is a conventional ion filter, e.g., a quadrupole or hexapole ion guide, and the ion source stage $IS_3$ is a mass spectrometer of any of the types described above. In this embodiment, the ion source stage $IS_2$ is controlled in a conventional manner to preselect ions having desired molecular characteristics for analysis by the downstream mass spectrometer, and to pass only such preselected ions to the mass spectrometer, wherein the ions analyzed by the ELIT 10 will be the preselected ions separated by the mass spectrometer according to mass or mass-to-charge ratio. The preselected ions exiting the ion filter may, for example, be ions having a specified ion mass or mass-to-charge ratio, ions having ion masses or ion mass-to-charge ratios above and/or below a specified ion mass or ion mass-to-charge ratio, ions having ion masses or ion mass-to-charge ratios within a specified range of ion mass or ion mass-to-charge ratio, or the like. In some alternate implementations of this example, the ion source stage $IS_2$ may be the mass spectrometer and the ion source stage $IS_3$ may be the ion filter, and the ion filter may be otherwise operable as just described to preselect ions exiting the mass spectrometer which have desired molecular characteristics for analysis by the downstream ELIT 10. In other alternate implementations of this example, the ion source stage $IS_2$ may be the ion filter, and the ion source stage $IS_3$ may include a mass spectrometer followed by another ion filter, wherein the ion filters each operate as just described.

As another specific implementation of the ion separation instrument 200 illustrated in FIG. 6A, which should not be considered to be limiting in any way, the ion source 25 illustratively includes 2 stages, and the ion processing instrument 210 is again omitted. In this example implementation, the ion source stage $IS_1$ is a conventional source of ions, e.g., electrospray, MALDI or the like, the ion source stage $IS_2$ is a conventional mass spectrometer of any of the types described above. This is the CDMS implementation described above with respect to FIG. 2 in which the ELIT 10 is operable to analyze ions exiting the mass spectrometer.

As yet another specific implementation of the ion separation instrument 200 illustrated in FIG. 6A, which should not be considered to be limiting in any way, the ion source 25 illustratively includes 2 stages, and the ion processing instrument 210 is omitted. In this example implementation, the ion source stage $IS_1$ is a conventional source of ions, e.g., electrospray, MALDI or the like, and the ion processing stage $OS_2$ is a conventional single or multiple-stage ion mobility spectrometer. In this implementation, the ion mobility spectrometer is operable to separate ions, generated by the ion source stage $IS_1$, over time according to one or more functions of ion mobility, and the ELIT 10 is operable to analyze ions exiting the ion mobility spectrometer. In an alternate implementation of this example, the ion source 25 may include only a single stage $IS_1$ in the form of a conventional source of ions, and the ion processing instrument 210 may include a conventional single or multiple-stage ion mobility spectrometer as a sole stage $OS_1$ (or as stage OS1 of a multiple-stage instrument 210). In this alternate implementation, the ELIT 10 is operable to analyze ions generated by the ion source stage $IS_1$, and the ion mobility spectrometer $OS_1$ is operable to separate ions exiting the ELIT 10 over time according to one or more functions of ion mobility. As another alternate implementation of this example, single or multiple-stage ion mobility spectrometers may follow both the ion source stage $IS_1$ and the ELIT 10. In this alternate implementation, the ion mobility spectrometer following the ion source stage $IS_1$ is operable to separate ions, generated by the ion source stage $IS_1$, over time according to one or more functions of ion mobility, the ELIT 10 is operable to analyze ions exiting the ion source stage ion mobility spectrometer, and the ion mobility spectrometer of the ion processing stage $OS_1$ following the ELIT 10 is operable to separate ions exiting the ELIT 10 over time according to one or more functions of ion mobility. In any implementations of the embodiment described in this paragraph, additional variants may include a mass spectrometer operatively positioned upstream and/or downstream of the single or multiple-stage ion mobility spectrometer in the ion source 25 and/or in the ion processing instrument 210.

As still another specific implementation of the ion separation instrument 200 illustrated in FIG. 6A, which should not be considered to be limiting in any way, the ion source 25 illustratively includes 2 stages, and the ion processing instrument 210 is omitted. In this example implementation, the ion source stage $IS_1$ is a conventional liquid chromatograph, e.g., HPLC or the like configured to separate molecules in solution according to molecule retention time, and the ion source stage $IS_2$ is a conventional source of ions, e.g., electrospray or the like. In this implementation, the liquid chromatograph is operable to separate molecular components in solution, the ion source stage $IS_2$ is operable to generate ions from the solution flow exiting the liquid chromatograph, and the ELIT 10 is operable to analyze ions generated by the ion source stage $IS_2$. In an alternate implementation of this example, the ion source stage $IS_1$ may instead be a conventional size-exclusion chromatograph (SEC) operable to separate molecules in solution by size. In another alternate implementation, the ion source stage $IS_1$ may include a conventional liquid chromatograph followed by a conventional SEC or vice versa. In this implementation, ions are generated by the ion source stage $IS_2$ from a twice separated solution; once according to molecule retention time followed by a second according to molecule size, or vice versa. In any implementations of the embodiment described in this paragraph, additional variants may include a mass spectrometer operatively positioned between the ion source stage $IS_2$ and the ELIT 10.

Figure 6B:
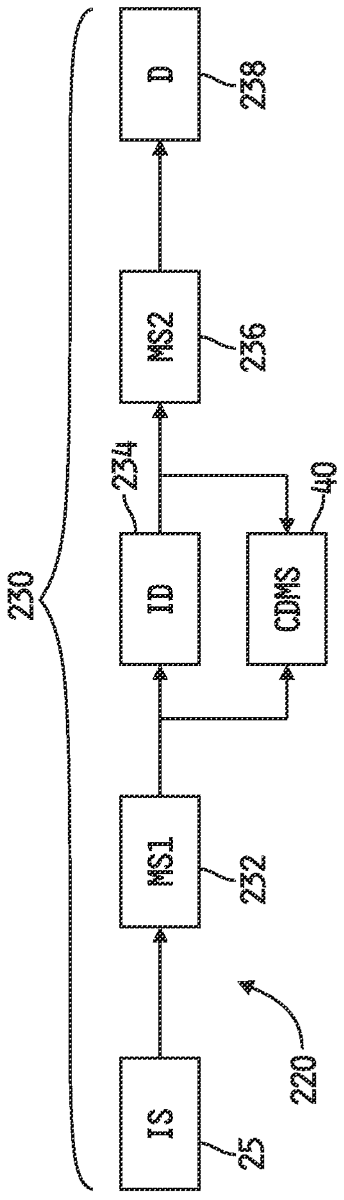
FIG. 6B is a simplified block diagram of another embodiment of an ion separation instrument including the ELIT illustrated in FIGS. 1-2 and operating as described herein, showing an example implementation which combines conventional ion processing instruments with the CDMS or ELIT illustrated and described herein.

Referring now to FIG. 6B, a simplified block diagram is shown of another embodiment of an ion separation instrument 220 which illustratively includes a multi-stage mass spectrometer instrument 230 and which also includes the charge detection mass spectrometer (CDMS) 40, illustrated in FIG. 2 and described herein and implemented in the embodiment of FIG. 6B as a high-mass ion analysis component. In the illustrated embodiment, the multi-stage mass spectrometer instrument 230 includes an ion source (IS) 25, as illustrated and described herein, followed by and coupled to a first conventional mass spectrometer (MS1) 232, followed by and coupled to a conventional ion dissociation stage (ID) 234 operable to dissociate ions exiting the mass spectrometer 232, e.g., by one or more of collision-induced dissociation (CID), surface-induced dissociation (SID), electron capture dissociation (ECD) and/or photo-induced dissociation (PID) or the like, followed by an coupled to a second conventional mass spectrometer (MS2) 236, followed by a conventional ion detector (D) 238, e.g., such as a microchannel plate detector or other conventional ion detector. The CDMS 40 is coupled in parallel with and to the ion dissociation stage 234 such that the CDMS 40 may selectively receive ions from the mass spectrometer 236 and/or from the ion dissociation stage 232.

MS/MS, e.g., using only the ion separation instrument 230, is a well-established approach where precursor ions of a particular molecular weight are selected by the first mass spectrometer 232 (MS1) based on their m/z value. The mass selected precursor ions are fragmented, e.g., by collision-induced dissociation, surface-induced dissociation, electron capture dissociation or photo-induced dissociation, in the ion dissociation stage 234. The fragment ions are then analyzed by the second mass spectrometer 236 (MS2). Only the m/z values of the precursor and fragment ions are measured in both MS1 and MS2. For high mass ions, the charge states are not resolved and so it is not possible to select precursor ions with a specific molecular weight based on the m/z value alone. However, by coupling the instrument 230 to the CDMS 40 illustrated and described herein, it is possible to select a narrow range of m/z values using MS1 and then use the CDMS 40 to determine the masses of the m/z selected precursor ions. The mass spectrometers 232, 236 may be, for example, one or any combination of a magnetic sector mass spectrometer, time-of-flight mass spectrometer or quadrupole mass spectrometer, although in alternate embodiments other mass spectrometer types may be used, non-limiting examples of which are described hereinabove. In any case, the m/z selected precursor ions with known masses exiting MS1 can be fragmented in the ion dissociation stage 234, and the resulting fragment ions can then be analyzed by MS2 (where only the m/z ratio is measured) and/or by the CDMS instrument 40 (where the m/z ratio and charge are measured simultaneously). Low mass fragments, i.e., dissociated ions of precursor ions having mass values below a threshold mass value, e.g., 10,000 Da (or other mass value), can thus be analyzed by conventional MS, using MS2, while high mass fragments (where the charge states are not resolved), i.e., dissociated ions of precursor ions having mass values at or above the threshold mass value, can be analyzed by CDMS.

It will be understood that one or more charge detection optimization techniques may be used with the ELIT 10 alone and/or in any of the systems 40, 200, 220 illustrated in the attached figures and described herein, e.g., for trigger trapping and/or other charge detection events. Examples of some such charge detection optimization techniques are illustrated and described in U.S. Patent Application Ser. No. 62/680,296, filed Jun. 4, 2018 and in International Patent Application No. PCT/US2019/13284, filed Jan. 11, 2019, both entitled APPARATUS AND METHOD FOR CAPTURING IONS IN AN ELECTROSTATIC LINEAR ION TRAP, the disclosures of which are both expressly incorporated herein by reference in their entireties.

It will be further understood that one or more charge calibration or resetting apparatuses may be used with the charge detection cylinder CD of the ELIT 10 alone and/or in any of the systems 40, 200, 220 illustrated in the attached figures and described herein. An example of one such charge calibration or resetting apparatus is illustrated and described in U.S. Patent Application Ser. No. 62/680,272, filed Jun. 4, 2018 and in International Patent Application No. PCT/US2019/13284, filed Jan. 11, 2019, both entitled APPARATUS AND METHOD FOR CALIBRATING OR RESETTING A CHARGE DETECTOR, the disclosures of which are both expressly incorporated herein by reference in their entireties.

It will be still further understood that the design concepts for achieving a desired duty cycle within the ELIT 10 alone and/or in any of the systems 40, 200, 220 illustrated in the attached figures and described herein may be implemented in an ELIT array including two or more ELITs and/or in any ELIT including two or more ELIT regions. Examples of some such ELITs and/or ELIT arrays are illustrated and described in U.S. Patent Application Ser. No. 62/680,315, filed Jun. 4, 2018 and in International Patent Application No. PCT/US2019/13283, filed Jan. 11, 2019, both entitled ION TRAP ARRAY FOR HIGH THROUGHPUT CHARGE DETECTION MASS SPECTROMETRY, the disclosures of which are both expressly incorporated herein by reference in their entireties.

It will be further understood that one or more ion source optimization apparatuses and/or techniques may be used with one or more embodiments of the ion source 25 illustrated and described herein in combination with the ELIT 10 along and/or in any of the systems 40, 200, 220 illustrated in the attached figures and described herein, some examples of which are illustrated and described in U.S. Patent Application Ser. No. 62/680,223, filed Jun. 4, 2018 and entitled HYBRID ION FUNNEL-ION CARPET (FUNPET) ATMOSPHERIC PRESSURE INTERFACE FOR CHARGE DETECTION MASS SPECTROMETRY, and in co-pending International Patent Application No. PCT/US2019/13274, filed Jan. 11, 2019 and entitled INTERFACE FOR TRANSPORTING IONS FROM AN ATMOSPHERIC PRESSURE ENVIRONMENT TO A LOW PRESSURE ENVIRONMENT, the disclosures of which are both expressly incorporated herein by reference in their entireties.

It will be still further understood that the charge detection mass spectrometer 40, the ion separation instrument 200, the ion separation instrument 230 and/or the ELIT 10 illustrated in the attached figures and described herein may be implemented in accordance with real-time analysis and/or real-time control techniques, some examples of which are illustrated and described in U.S. Patent Application Ser. No. 62/680,245, filed Jun. 4, 2018 and International Patent Application No. PCT/US2019/13277, filed Jan. 11, 2019, both entitled CHARGE DETECTION MASS SPECTROMETRY WITH REAL TIME ANALYSIS AND SIGNAL OPTIMIZATION, the disclosures of which are both expressly incorporated herein by reference in their entireties.

It will be yet further understood that one or more ion inlet trajectory control apparatuses and/or techniques may be used with the ELIT 10 alone and/or in any of the systems 40, 200, 220 illustrated in the attached figures and described herein to provide for simultaneous measurements of multiple individual ions within the ELIT 10. Examples of some such ion inlet trajectory control apparatuses and/or techniques are illustrated and described in U.S. Patent Application Ser. No. 62/774,703, filed Dec. 3, 2018 and in International Patent Application No. PCT/US2019/13285, filed Jan. 11, 2019, both entitled APPARATUS AND METHOD FOR SIMULTANEOUSLY ANALYZING MULTIPLE IONS WITH AN ELECTROSTATIC LINEAR ION TRAP, the disclosures of which are both expressly incorporated herein by reference in their entireties.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected. For example, while the ELIT 10 illustrated in the attached figures has been described herein as being designed and operated with an oscillating charge detection signal having a duty cycle of approximately 50% for the purpose of reducing noise in fundamental frequency magnitude determinations resulting from harmonic frequency components of the signal, this disclosure also contemplates alternatively or additionally employing other structures and/or techniques for reducing the effects of harmonic frequency components on such fundamental frequency magnitude determinations. Examples of such other structures and/or techniques may include, but are not limited to, one or more harmonic component filtering structures and/or techniques, one or more wave-shaping structures and/or techniques, one or more multi-phase operating structures and/or techniques, and the like. As another example, although the ion mirrors M1 and M2 are illustrated in the attached figures and described herein as each including an aligned arrangement of three spaced-apart mirror electrodes, it will be understood that such embodiments are provided only by way of example and should not be considered limiting in any way. Alternate embodiments in which either or both of the ion mirrors M1, M2 include more or fewer mirror electrodes are intended to fall within the scope of this disclosure. As yet another example, it will be understood that the steps of the process 100 illustrated in the attached figures and described herein are also provided only by way of example and should not be considered limiting in any way. Alternate techniques for operating the ELIT 10 described herein to capture the measurements and data described herein are intended to fall within the scope of this disclosure, and it will be recognized that any such alternate techniques will be a mechanical step for one skilled in the art using the concepts described herein as a template. As still another example, it will be understood that the ELIT 10 illustrated in the attached figures and described herein is provided only by way of example, and that the concepts, structures and techniques described above may be implemented directly in ELITs of various alternate designs. Any such alternate ELIT design may, for example, include any one or combination of two or more ELIT regions, more, fewer and/or differently-shaped ion mirror electrodes, more or fewer voltage sources, more or fewer DC or time-varying signals produced by one or more of the voltage sources, one or more ion mirrors defining additional electric field regions, or the like.

What is claimed is:

1. An instrument for analyzing ions, comprising:

an ion source configured to generate ions from a sample, at least one ion processing instrument configured to receive the generated ions from the ion source and to process the generated ions by one or a combination of filtering the ions according to a molecular characteristic and dissociating the ions, an electrostatic linear ion trap (ELIT) positioned to receive ions exiting the at least one ion processing instrument and configured to trap at least one of the received ions therein, the ELIT including first and second ion mirrors and a charge detection cylinder positioned between the first and second ion mirrors, and at least one voltage source coupled to the first and second ion mirrors, the at least one voltage source configured to establish electric fields in each of the first and second ion mirrors configured to reflect the trapped at least one ion entering a respective one of the first and second ion mirrors from the charge detection cylinder back through the charge detection cylinder and toward the other of the first and second ion mirrors such the trapped at least one ion oscillates back and forth through the charge detection cylinder between the first and second ion mirrors with a duty cycle, corresponding to a ratio of time spent by the trapped at least one ion traversing the charge detection cylinder and total time spent by the trapped at least one ion traversing a combination of the first and second ion mirrors and the charge detection cylinder during one complete oscillation cycle, of approximately 50%.

2. The instrument of claim 1, wherein the at least one ion processing instrument comprises:

a first ion processing instrument configured to receive the generated ions from the ion source and to filter the generated ions according to the molecular characteristic, and a second ion processing instrument configured to receive the filtered ions and to dissociate the filtered ions, wherein the ELIT receives the dissociated ions from the second ion processing instrument.

3. The instrument of claim 2, further comprising at least one ion separation instrument positioned between the ion source and the first ion processing instrument, the at least one ion separation instrument configured to separate the generated ions as a function of at least one molecular characteristic and to pass the separated ions to the first ion processing instrument.

4. The instrument of claim 3, wherein the at least one ion separation instrument comprises one or any combination of at least one instrument for separating ions as a function of mass-to-charge ratio, at least one instrument for separating ions as a function of ion mobility, at least one instrument for separating ions as a function of ion retention time and at least one instrument for separating ions as a function of molecule size.

5. The instrument of claim 1, wherein the at least one ion processing instrument comprises:

a first ion processing instrument configured to receive the generated ions from the ion source and to dissociate the generated ions, and a second ion processing instrument configured to receive the dissociated ions and to filter the dissociated ions according to the molecular characteristic, wherein the ELIT receives the filtered ions from the second ion processing instrument.

6. The instrument of claim 5, further comprising at least one ion separation instrument positioned between the ion source and the first ion processing instrument, the at least one ion separation instrument configured to separate the generated ions as a function of at least one molecular characteristic and to pass the separated ions to the first ion processing instrument.

7. The instrument of claim 6, wherein the at least one ion separation instrument comprises one or any combination of at least one instrument for separating ions as a function of mass-to-charge ratio, at least one instrument for separating ions as a function of ion mobility, at least one instrument for separating ions as a function of ion retention time and at least one instrument for separating ions as a function of molecule size.

8. The instrument of claim 1, further comprising at least one ion separation instrument positioned between the at least one ion processing instrument and the ELIT, the at least one ion separation instrument configured to separate ions exiting the at least one ion processing instrument as a function of at least one molecular characteristic and to pass the separated ions to the ELIT.

9. The instrument of claim 1, further comprising a processor and a memory having instructions stored therein executable by the processor to cause the processor to control the at least one voltage source to produce at least one output voltage to establish the electric fields in the first and second ion mirrors.

10. The instrument of claim 1, further comprising a charge pre-amplifier having an input coupled to the charge detection cylinder, wherein the trapped at least one ion induces a charge on the charge detection cylinder each time the trapped at least one ion passes therethrough, and the charge pre-amplifier produces charge detection signals corresponding to detections of the charges induced by the at least one trapped ion on the charge detection cylinder, a processor having an input coupled to an output of the charge pre-amplifier, and a memory having instructions stored therein executable by the processor to cause the processor to process a plurality of the charge detection signals, resulting from oscillation of the trapped at least one ion multiple times back and forth through the charge detection cylinder between the first and second ion mirrors, to determine a mass-to-charge ratio of the trapped at least one ion and to determine a charge of the trapped at least one ion, and to compute a mass of the trapped at least one ion based on the determined mass-to-charge ratio and the determined charge of the trapped at least one ion.

11. An instrument for analyzing ions, comprising:

an ion source configured to generate ions from a sample, at least one ion processing instrument configured to receive the generated ions from the ion source and to process the generated ions by one or a combination of filtering the ions according to a molecular characteristic and dissociating the ions, an electrostatic linear ion trap (ELIT) positioned to receive ions exiting the at least one ion processing instrument and configured to trap at least one of the received ions therein, the ELIT including first and second ion mirrors and a charge detection cylinder positioned between the first and second ion mirrors, and at least one voltage source coupled to the first and second ion mirrors, the at least one voltage source configured to establish electric fields in each of the first and second ion mirrors configured to reflect the trapped at least one ion entering a respective one of the first and second ion mirrors from the charge detection cylinder back through the charge detection cylinder and into the other of the first and second ion mirrors such the trapped at least one ion oscillates back and forth between the first and second ion mirrors each time passing through the charge detection cylinder, wherein time spent by the trapped at least one ion passing through the charge detection cylinder is approximately equal to a sum of time spent by the trapped at least one ion travelling from a stopped position within one of the first and second ion mirrors into a respective end of the charge detection cylinder and time spent by the trapped at least one ion traveling from an opposite respective end of the charge detection cylinder to a stopped position within the other of the first and second ion mirrors.

12. The instrument of claim 11, further comprising at least one ion separation instrument positioned between the ion source and the at least one ion processing instrument, the at least one ion separation instrument configured to separate the generated ions as a function of at least one molecular characteristic and to pass the separated ions to the at least one ion processing instrument, wherein the at least one ion separation instrument comprises one or any combination of at least one instrument for separating ions as a function of mass-to-charge ratio, at least one instrument for separating ions as a function of ion mobility, at least one instrument for separating ions as a function of ion retention time and at least one instrument for separating ions as a function of molecule size.

13. The instrument of claim 11, wherein the at least one ion processing instrument comprises:

a first ion processing instrument configured to receive the generated ions from the ion source and to filter the generated ions according to the molecular characteristic, and a second ion processing instrument configured to receive the filtered ions and to dissociate the filtered ions, wherein the ELIT receives the dissociated ions from the second ion processing instrument.

14. The instrument of claim 11, wherein the at least one ion processing instrument comprises:

a first ion processing instrument configured to receive the generated ions from the ion source and to dissociate the generated ions, and a second ion processing instrument configured to receive the dissociated ions and to filter the dissociated ions according to the molecular characteristic, wherein the ELIT receives the filtered ions from the second ion processing instrument.

15. The instrument of claim 11, further comprising at least one ion separation instrument positioned between the at least one ion processing instrument and the ELIT, the at least one ion separation instrument configured to separate ions exiting the at least one ion processing instrument as a function of at least one molecular characteristic and to pass the separated ions to the ELIT, wherein the at least one ion separation instrument comprises one or any combination of at least one instrument for separating ions as a function of mass-to-charge ratio, at least one instrument for separating ions as a function of ion mobility, at least one instrument for separating ions as a function of ion retention time and at least one instrument for separating ions as a function of molecule size.

16. A method for analyzing ions, comprising:

generating ions from a sample, processing the generated ions by one of filtering the ions according to a molecular characteristic and dissociating the ions to produce first processed ions, processing the first processed ions by the other of filtering the ions according to the molecular characteristic and dissociating the ions to produce second processed ions, and analyzing the second processed ions with an electrostatic linear ion trap, having first and second ion mirrors and a charge detection cylinder positioned between the first and second ion mirrors, by (i) establishing a first electric field in the first ion mirror, the first electric field configured to stop in the first ion mirror at least one of the second processed ions exiting a first end of the charge detection cylinder, proximate to the first ion mirror, and traveling into the first ion mirror, and to accelerate the stopped at least one of the second processed ions in the first ion mirror back into the first end of the charge detection cylinder, and (ii) establishing a second electric field in the second ion mirror, the second electric field configured to stop in the second ion mirror the at least one of the second processed ions exiting a second end of the charge detection cylinder, proximate to the second ion mirror, and traveling into the second ion mirror, and to accelerate the stopped at least one of the second processed ions in the second ion mirror back into the second end of the charge detection cylinder, such that the at least one of the second processed ions oscillates back and forth between the first and second ion mirrors under the influence of the first and second electric fields each time passing through the charge detection cylinder, wherein time spent by the at least one of the second processed ions passing through the charge detection cylinder is approximately equal to a sum of time spent by the at least one of the second processed ions travelling from a stopped position within one of first and second ion passageways into a respective end of the charge detection cylinder and time spent by the at least one of the second processed ions traveling from an opposite respective end of the charge detection cylinder to a stopped position within the other of the first and second ion passageways.

17. The method of claim 16, further comprising, prior to processing the generated ions to produce the first processed ions, separating the generated ions as a function of at least one molecular characteristic, wherein the first processed ions are produced by one of filtering the separated ions according to the molecular characteristic and dissociating the separated ions.

18. The method of claim 17, wherein separating the generated ions as a function of at least one molecular characteristic comprises separating the generated ions as a function of one or more of mass-to-charge ratio, ion mobility, ion retention time and molecule size.

19. The method of claim 16, wherein each passage of the at least one of the second processed ions through the charge detection cylinder induces a corresponding at least one charge on the charge detection cylinder, and wherein the method further comprises (i) processing, with at least one processor, a plurality of the at least one charges induced on the charge detection cylinder resulting from oscillation of the at least one of the second processed ions multiple times back and forth through the charge detection cylinder between the first and second ion mirrors to determine a mass-to-charge ratio of the at least one of the second processed ions and to determine a charge of the at least one of the second processed ions, and (ii) to compute a mass of the at least one of the second processed ions based on the determined mass-to-charge ratio and the determined charge.

20. The method of claim 19, further comprising amplifying each of the at least one charges induced on the charge detection cylinder to produce a corresponding at least one charge detection signal, wherein processing the plurality of the at least one charges induced on the charge detection cylinder comprises processing, with the at least one processor, a plurality of the at least one charge detection signals.

* * * * *